US008996621B2

(12) United States Patent
Kleppner

(10) Patent No.: US 8,996,621 B2
(45) Date of Patent: Mar. 31, 2015

(54) ASYNCHRONOUS COMMENT UPDATES

(75) Inventor: Paul Kleppner, Lexington, MA (US)

(73) Assignee: Adobe Systems Incorporated, San Jose, CA (US)

(*) Notice: Subject to any disclaimer, the term of this patent is extended or adjusted under 35 U.S.C. 154(b) by 204 days.

(21) Appl. No.: 12/119,350

(22) Filed: May 12, 2008

(65) Prior Publication Data

US 2014/0032633 A1    Jan. 30, 2014

(51) Int. Cl.
G06F 15/16    (2006.01)
G06F 17/24    (2006.01)

(52) U.S. Cl.
CPC .................................... *G06F 17/241* (2013.01)
USPC .......................................................... 709/206

(58) Field of Classification Search
CPC ......................... G06F 17/241; G06F 17/30011
USPC .......................................... 709/207; 715/230
See application file for complete search history.

(56) References Cited

U.S. PATENT DOCUMENTS

| | | |
|---|---|---|
| 4,714,992 A | 12/1987 | Gladney et al. |
| 4,949,300 A | 8/1990 | Christenson et al. |
| 5,008,853 A | 4/1991 | Bly et al. |
| 5,014,267 A | 5/1991 | Tompkins et al. |
| 5,072,412 A | 12/1991 | Henderson, Jr. et al. |
| 5,220,657 A | 6/1993 | Bly et al. |
| 5,245,553 A | 9/1993 | Tanenbaum |
| 5,247,615 A | 9/1993 | Mori et al. |
| 5,293,619 A | 3/1994 | Dean |
| 5,339,389 A | 8/1994 | Bates et al. |
| 5,379,374 A | 1/1995 | Ishizaki et al. |
| 5,388,196 A | 2/1995 | Pajak et al. |
| 5,428,729 A | 6/1995 | Chang et al. |
| 5,446,842 A | 8/1995 | Schaeffer et al. |
| 5,471,318 A | 11/1995 | Ahuja et al. |
| 5,515,491 A | 5/1996 | Bates et al. |
| 5,537,529 A | 7/1996 | Borovoy et al. |
| 5,608,872 A | 3/1997 | Schwartz et al. |
| 5,617,539 A | 4/1997 | Ludwig et al. |
| 5,664,183 A | 9/1997 | Cirulli et al. |
| 5,671,428 A | 9/1997 | Muranaga et al. |
| 5,732,184 A | 3/1998 | Chao et al. |
| 5,758,079 A | 5/1998 | Ludwig et al. |

(Continued)

FOREIGN PATENT DOCUMENTS

EP    0932108 A2    7/1999

OTHER PUBLICATIONS

Brush et al. "Robust Annotation Positioning in Digital Documents." SIGCHI'01, Mar. 31-Apr. 4, 2001, Seattle, WA, USA. pp. 285-292.*

(Continued)

*Primary Examiner* — Christopher Biagini
(74) *Attorney, Agent, or Firm* — Shook Hardy & Bacon LLP

(57) ABSTRACT

Apparatus, systems, and methods may operate to receive a comment object from a first client computer, the comment object being associated with an electronic document accessed from the first client computer. Further actions may include assigning the comment object a unique identifier, placing the comment object in a queue according to the unique identifier, and forwarding the comment object to a second client computer in response to opening the electronic document by the second client computer. Additional apparatus, systems, and methods are disclosed.

21 Claims, 10 Drawing Sheets

(56) References Cited

U.S. PATENT DOCUMENTS

| | | | |
|---|---|---|---|
| 5,764,902 A * | 6/1998 | Rothrock | 709/205 |
| 5,778,368 A | 7/1998 | Hogan et al. | |
| 5,787,175 A | 7/1998 | Carter | |
| 5,806,078 A | 9/1998 | Hug et al. | |
| 5,835,601 A | 11/1998 | Shimbo et al. | |
| 5,867,654 A | 2/1999 | Ludwig et al. | |
| 5,907,324 A | 5/1999 | Larson et al. | |
| 5,909,689 A | 6/1999 | Van Ryzin | |
| 5,920,694 A | 7/1999 | Carleton et al. | |
| 5,963,208 A | 10/1999 | Dolan et al. | |
| 5,966,512 A | 10/1999 | Bates et al. | |
| 5,978,817 A | 11/1999 | Giannandrea et al. | |
| 5,995,097 A | 11/1999 | Tokumine et al. | |
| 6,005,568 A | 12/1999 | Simonoff et al. | |
| 6,005,571 A | 12/1999 | Pachauri | |
| 6,088,702 A | 7/2000 | Plantz et al. | |
| 6,243,722 B1 | 6/2001 | Day et al. | |
| 6,266,683 B1 * | 7/2001 | Yehuda et al. | 715/234 |
| 6,314,408 B1 | 11/2001 | Salas et al. | |
| 6,314,425 B1 | 11/2001 | Serbinis et al. | |
| 6,342,906 B1 | 1/2002 | Kumar et al. | |
| 6,366,930 B1 | 4/2002 | Parker et al. | |
| 6,366,933 B1 | 4/2002 | Ball et al. | |
| 6,442,748 B1 | 8/2002 | Bowman-Amuah et al. | |
| 6,446,093 B2 | 9/2002 | Tabuchi | |
| 6,502,113 B1 | 12/2002 | Crawford et al. | |
| 6,507,845 B1 | 1/2003 | Cohen et al. | |
| 6,584,466 B1 | 6/2003 | Serbinis et al. | |
| 6,596,030 B2 | 7/2003 | Ball et al. | |
| 6,632,251 B1 | 10/2003 | Rutten et al. | |
| 6,643,663 B1 | 11/2003 | Dabney et al. | |
| 6,701,345 B1 | 3/2004 | Carley et al. | |
| 6,721,921 B1 | 4/2004 | Altman | |
| 6,757,871 B1 | 6/2004 | Sato et al. | |
| 6,772,393 B1 | 8/2004 | Estrada et al. | |
| 6,816,906 B1 | 11/2004 | Icken et al. | |
| 6,819,806 B1 | 11/2004 | Kubota et al. | |
| 6,839,878 B1 | 1/2005 | Icken et al. | |
| 6,865,548 B2 | 3/2005 | Wiechers | |
| 6,865,713 B1 | 3/2005 | Bates et al. | |
| 6,874,124 B2 | 3/2005 | Murase et al. | |
| 6,889,896 B2 | 5/2005 | Silverbrook et al. | |
| 6,894,804 B2 | 5/2005 | Nguyen et al. | |
| 6,898,601 B2 | 5/2005 | Amado et al. | |
| 6,901,376 B1 | 5/2005 | Sculler et al. | |
| 6,918,082 B1 | 7/2005 | Gross et al. | |
| 6,934,721 B2 | 8/2005 | Schein | |
| 6,950,828 B2 | 9/2005 | Shaw et al. | |
| 6,991,154 B2 | 1/2006 | Silverbrook et al. | |
| 7,007,232 B1 | 2/2006 | Ross et al. | |
| 7,028,267 B1 | 4/2006 | Beezer et al. | |
| 7,044,363 B2 | 5/2006 | Silverbrook et al. | |
| 7,051,031 B2 | 5/2006 | Schein | |
| 7,062,497 B2 | 6/2006 | Hamburg et al. | |
| 7,062,532 B1 | 6/2006 | Sweat et al. | |
| 7,146,367 B2 | 12/2006 | Shutt | |
| 7,149,760 B1 | 12/2006 | Breuer | |
| 7,249,314 B2 | 7/2007 | Walker et al. | |
| 7,263,655 B1 | 8/2007 | Carden, Jr. | |
| 7,325,186 B2 | 1/2008 | Jones et al. | |
| 7,392,469 B1 | 6/2008 | Bailin | |
| 7,421,660 B2 | 9/2008 | Charnock et al. | |
| 7,506,262 B2 * | 3/2009 | Gupta et al. | 715/751 |
| 7,587,407 B2 * | 9/2009 | Gruhl et al. | 707/999.101 |
| 7,702,618 B1 | 4/2010 | Patterson | |
| 7,724,249 B1 | 5/2010 | Horikawa et al. | |
| 7,769,810 B1 | 8/2010 | Kaufman | |
| 7,788,237 B2 | 8/2010 | Voronov et al. | |
| 7,809,688 B2 | 10/2010 | Cisler et al. | |
| 7,836,083 B2 | 11/2010 | Cipollone | |
| 7,904,425 B2 | 3/2011 | Cannon et al. | |
| 7,945,595 B1 | 5/2011 | Kraley | |
| 7,949,633 B1 | 5/2011 | Shaver et al. | |
| 7,950,064 B2 | 5/2011 | Chavez et al. | |
| 8,290,902 B1 | 10/2012 | Shaver et al. | |
| 8,316,292 B1 | 11/2012 | Verstak et al. | |
| 8,396,900 B1 | 3/2013 | Kraley | |
| 2001/0043716 A1 * | 11/2001 | Price et al. | 382/100 |
| 2001/0049704 A1 | 12/2001 | Hamburg et al. | |
| 2002/0133628 A1 * | 9/2002 | Asplund et al. | 709/246 |
| 2002/0163548 A1 | 11/2002 | Chiu et al. | |
| 2003/0214528 A1 | 11/2003 | Pierce et al. | |
| 2004/0041843 A1 | 3/2004 | Cui et al. | |
| 2004/0088331 A1 | 5/2004 | Therrien et al. | |
| 2004/0172595 A1 | 9/2004 | Lerner et al. | |
| 2005/0064858 A1 | 3/2005 | Makela et al. | |
| 2005/0081159 A1 * | 4/2005 | Gupta et al. | 715/751 |
| 2005/0097441 A1 | 5/2005 | Herbach et al. | |
| 2005/0193325 A1 | 9/2005 | Epstein | |
| 2005/0262225 A1 | 11/2005 | Halpern et al. | |
| 2006/0010382 A1 | 1/2006 | Ejiri et al. | |
| 2006/0026502 A1 | 2/2006 | Dutta | |
| 2006/0161516 A1 | 7/2006 | Clarke et al. | |
| 2006/0161578 A1 | 7/2006 | Siegel et al. | |
| 2007/0057967 A1 | 3/2007 | Armstrong | |
| 2007/0118794 A1 | 5/2007 | Hollander et al. | |
| 2007/0150433 A1 | 6/2007 | Chen | |
| 2007/0198616 A1 | 8/2007 | Goto | |
| 2007/0239831 A1 | 10/2007 | Basu | |
| 2007/0260996 A1 | 11/2007 | Jakobson | |
| 2007/0271248 A1 * | 11/2007 | Albernoz et al. | 707/3 |
| 2007/0271502 A1 | 11/2007 | Bedi et al. | |
| 2008/0016091 A1 | 1/2008 | Chandra | |
| 2008/0034018 A1 | 2/2008 | Cisler et al. | |
| 2008/0059539 A1 | 3/2008 | Chin et al. | |
| 2008/0072135 A1 * | 3/2008 | Cragun et al. | 715/230 |
| 2008/0103877 A1 | 5/2008 | Gerken | |
| 2008/0141126 A1 | 6/2008 | Johnson et al. | |
| 2008/0209361 A1 | 8/2008 | Nickerson et al. | |
| 2008/0250329 A1 | 10/2008 | Stefik et al. | |
| 2008/0250332 A1 | 10/2008 | Farrell et al. | |
| 2009/0097815 A1 * | 4/2009 | Lahr et al. | 386/52 |
| 2009/0157811 A1 * | 6/2009 | Bailor et al. | 709/204 |
| 2009/0235155 A1 * | 9/2009 | Ueda | 715/233 |
| 2010/0145947 A1 | 6/2010 | Kolman et al. | |
| 2013/0006919 A1 | 1/2013 | Shaver et al. | |
| 2013/0198622 A1 | 8/2013 | Kraley | |
| 2014/0032502 A1 | 1/2014 | Kraley | |
| 2014/0033013 A1 | 1/2014 | Shaver | |
| 2014/0033015 A1 | 1/2014 | Shaver | |

OTHER PUBLICATIONS

Grønbæk et al. "Webvise: browser and proxy support for open hypermedia structuring mechanisms on the World Wide Web." In proceedings of The Eighth International World Wide Web Conference, 1999. pp. 253-267.*

"Adobe to Acquire Virtual Ubiquity", *The Buzzword Blog Building the first real word processor for the web*, [Online] Retrieved from the Internet: <URL: http://blog.buzzword.com/vu/index.php-?paged=2>, (Oct. 1, 2007),10 pgs.

"Comparison of office suites", *Comparison of office suites—Wikipedia, the free encyclopedia*, [Online] Retrieved from the internet: <URL:http://en.wikipedia.org/wiki/List_of_office_suites>,(Mar. 16, 2008),4 pgs.

"Forthcoming Functionality", *The Buzzword Blog Building the first real word processor for the web*, [Online] Retrieved from the Internet: <URL:http://blog.buzzword.com/vu/index.php?paged=3>, (Jul. 15, 2007),10 pgs.

"Google Docs", *Google Docs—Wikipedia, the free encyclopedia*, [Online].Retrieved from the internet: <URL:http://en.wikipedia.org/wiki/Google_Docs>,(Mar. 16, 2008),3 pages.

"List of word processors", *From Wikipedia, the free encyclopedia The following is a list of word processors*, [Online] Retrieved from the internet: <URL:http://en.wikipedia.org/wiki/List_of_word_processors>,(Mar. 16, 2008),4 pgs.

"The Buzzword Blog Building the first real word processor for the web", *Buzzword vs Google docs*, [Online] Retrieved from the internet: <URL:http://blog.virtub.com/>,(Mar. 12, 2008),13 pages.

"ThinkFree Docs :: Search, Share & Publish documents Page", [Online] Retrieved from the internet: <URL:http://www.thinkfreedocs.com/, (Mar. 16, 2008),1 page.

(56) References Cited

OTHER PUBLICATIONS

"ThinkFree Docs::Search, Share & Publish documents", [Online]. Retrieved from the internet: <URL:http://www.thinkfreedocs.com/about/faq.html>, FAQ,(Mar. 16, 2008),1 page.
"ThinkFree Office by Haansoft Corporation", *From Wikipedia, the free encyclopedia* (*Redirected from ThinkFree*), [Online] Retrieved from the internet: <URL:http://en.wikipedia.org/wiki/ThinkFree>,(Nov. 7, 2006),3 pgs.
"Working with Collaborators: Real time collaboration", "Online". Retrieved from the internet: <URL:http://documents.google.com/support/bin/answer.py?answer=40971&topic=8628>, Google Docs Help Center,(Mar. 16, 2008),2 pages.
"Working with Collaborators: Simultaneous editing and viewing", [Online]. Retrieved from the Internet: <URL:http://documents.google.com/support/bin/answer.py?answer=44680&topic=8628>, Google Docs Help Center,(Mar. 16, 2008),2 pages.
"ZCubes", *From Wikipedia, the free encyclopedia*, [Online] Retrieved from the internet: <URL:http://en.wikipedia.org/wiki/ZCubes>,(Sep. 30, 2007),5 pages.
"Zoho Office Suite", *From Wikipedia, the free encyclopedia* (*Redirected from Zoho Writer*) *Developed by AdventNet Inc.* <URL:http://www.zoho.com>, [Online] Retrieved from the interent: <URL:http://en.wikipedia.org/wiki/Zoho_Writer>,(Mar. 16, 2008),5 pgs.
Descy, Don E., "Browser-Based Online Applications: Something for Everyone!", *TechTrends: Linking Research and Practice to Improve Learning*, 51(2), (Mar. 2007),3-5.
Shen, H. , "Integrating Advanced Collaborative Capabilities into Web-Based Word Processors", *Lecture Notes in Computer Science*, 4674, (2007),1-8.
Simsarian, Kristian , et al., "Shared Spatial Desktop Development", *Kungl Tekniska Hogskolan Royal Institute of Technology Numerical Analysis and Computing Science. CID-86, KTH, Stockholm, Sweden 1999*, Report number: CID-86 ISSN No. ISSN 1403-073X Reports can be ordered from: URL: http://www.nada.kth.se/cid/,(Aug. 1999),103 pages.
"U.S. Appl. No. 12/119,397, Response filed Feb. 15, 2013 to Non Final Office Action mailed Oct. 16, 2012", 10 pgs.
"U.S. Appl. No. 12/119,421, Non Final Office Action mailed Apr. 15, 2013", 23 pgs.
"U.S. Appl. No. 12/119,249, Examiner Interview Summary mailed Oct. 5, 2010", 3 pgs.
"U.S. Appl. No. 12/119,249, Final Office Action mailed Jun. 9, 2011", 15 pgs.
"U.S. Appl. No. 12/119,249, Non Final Office Action mailed Dec. 23, 2010", 11 pgs.
"U.S. Appl. No. 12/119,249, Response filed Mar. 23, 2011 to Non Final Office Action mailed Dec. 23, 2010", 10 pgs.
"U.S. Appl. No. 12/119,249, Response filed Oct. 10, 2011 to Final Office Action mailed Jun. 9, 2011", 9 pgs.
"U.S. Appl. No. 12/119,335, Non-Final Office Action mailed Sep. 1, 2010", 8 pgs.
"U.S. Appl. No. 12/119,335, Notice of Allowance mailed Jan. 13, 2011", 4 pgs.
"U.S. Appl. No. 12/119,335, Response filed Dec. 1, 2010 to Non Final Office Action mailed Sep. 1, 2010", 12 pgs.
"U.S. Appl. No. 12/119,397 , Appeal Brief filed May 23, 2012", 17 pgs.
"U.S. Appl. No. 12/119,397, Final Office Action mailed Oct. 28, 2011", 18 pgs.
"U.S. Appl. No. 12/119,397, Non Final Office Action mailed Jun. 23, 2011", 20 pgs.
"U.S. Appl. No. 12/119,397, Non Final Office Action mailed Oct. 16, 2012", 20 pgs.
"U.S. Appl. No. 12/119,397, Response filed Aug. 10, 2011 to Non Final Office Action mailed Jun. 23, 2011", 9 pgs.
"U.S. Appl. No. 12/119,407, 312 Amendment filed Apr. 11, 2011", 3 pgs.
"U.S. Appl. No. 12/119,407, Non-Final Office Action mailed Sep. 9, 2010", 12 pgs.
"U.S. Appl. No. 12/119,407, Notice of Allowance mailed Feb. 18, 2011", 7 pgs.
"U.S. Appl. No. 12/119,407, PTO Response to 312 Amendment mailed Apr. 15, 2011", 2 pgs.
"U.S. Appl. No. 12/119,407, Response filed Dec. 9, 2010 to Non Final Office Action mailed Sep. 9, 2010", 17 pgs.
"U.S. Appl. No. 12/119,421, Appeal Brief filed Jul. 27, 2012", 25 pgs.
"U.S. Appl. No. 12/119,421, Advisory Action mailed Mar. 22, 2011", 3 pgs.
"U.S. Appl. No. 12/119,421, Final Office Action mailed Jan. 13, 2011", 27 pgs.
"U.S. Appl. No. 12/119,421, Final Office Action mailed Feb. 29, 2012", 31 pgs.
"U.S. Appl. No. 12/119,421, Non Final Office Action mailed Oct. 18, 2011", 29 pgs.
"U.S. Appl. No. 12/119,421, Non-Final Office Action mailed Sep. 14, 2010", 22 pgs.
"U.S. Appl. No. 12/119,421, Response filed Jan. 18, 2012 to Non Final Office Action mailed Oct. 18, 2011", 15 pgs.
"U.S. Appl. No. 12/119,421, Response filed Mar. 3, 2011 to Final Office Action mailed Jan. 13, 2011", 13 pgs.
"U.S. Appl. No. 12/119,421, Response filed May 12, 2011 to Advisory Action mailed Mar. 22, 2011", 15 pgs.
"U.S. Appl. No. 12/119,421, Response filed Nov. 23, 2010 to Non-Final Office Action mailed Sep. 14, 2010", 14 pgs.
"U.S. Appl. No. 12/119,421, Examiner Interview Summary mailed Jan. 31, 2012", 3 pgs.
"U.S. Appl. No. 13/081,236, Non Final Office Action mailed Jan. 24, 2012", 10 pgs.
"U.S. Appl. No. 13/081,236, Notice of Allowance mailed Jun. 14, 2012", 9 pgs.
"U.S. Appl. No. 13/081,236, Response filed Apr. 24, 2012 to Non Final Office Action mailed Jan. 24, 2012", 12 pgs.
"U.S. Appl. No. 13/081,267, Non Final Office Action mailed Jul. 13, 2012", 6 pgs.
"U.S. Appl. No. 13/081,267, Notice of Allowance mailed Nov. 9, 2012", 5 pgs.
"U.S. Appl. No. 13/081,267, Response filed Oct. 10, 2012 to Non-Final Office Action mailed Jul. 13, 2012", 8 pgs.
Agarwal, Deborah, et al., "Supporting collaborative computing and interaction", Lawrence Berkeley National Laboratory, (May 22, 2002), 6 pgs.
"U.S. Appl. No. 12/119,397, Final Office Action mailed Jun. 7, 2013", 21 pgs.
"U.S. Appl. No. 12/119,397, Response filed Oct. 7, 2013 to Final Office Action mailed Jun. 7, 2013", 12 pgs.
"U.S. Appl. No. 12/119,421, Examiner Interview Summary mailed Jan. 6, 2014", 3 pgs.
"U.S. Appl. No. 12/119,421, Examiner interview Summary mailed Aug. 6, 2013", 3 pgs.
"U.S. Appl. No. 12/119,421, Final Office Action mailed Nov. 14, 2013", 23 pgs.
"U.S. Appl. No. 12/119,421, Response filed Jul. 11, 2013 to Non Final Office Action mailed Apr. 15, 2013", 12 pgs.
"U.S. Appl. No. 13/612,549, Non Final Office Action mailed Oct. 25, 2013", 7 pgs.
"U.S. Appl. No. 13/612,549, Response mailed Jan. 29, 2014 to Non Final Office Action mailed Oct. 25, 2013", 10 pgs.
"U.S. Appl. No. 13/794,079, Non Final Office Action mailed Dec. 13, 2013", 7 pgs.
Wiley, John, "Microsoft® Word 2007 Bible by Herb Tyson Publisher", (Mar. 12, 2007), pp. 797-800.

\* cited by examiner ature, according to various embodiments.
ASYNCHRONOUS COMMENT UPDATES

BACKGROUND

Electronic documents are used in a wide variety of software applications and on a wide variety of hardware platforms. Documents may include word processing documents, spreadsheets, multimedia presentations, video recordings, audio recordings, image files, and the like. Software applications are used to view, edit, and manage these types of documents.

BRIEF DESCRIPTION OF DRAWINGS

Some embodiments are illustrated by way of example and not limitation in the figures of the accompanying drawings in which.

DETAILED DESCRIPTION

Figure 1:
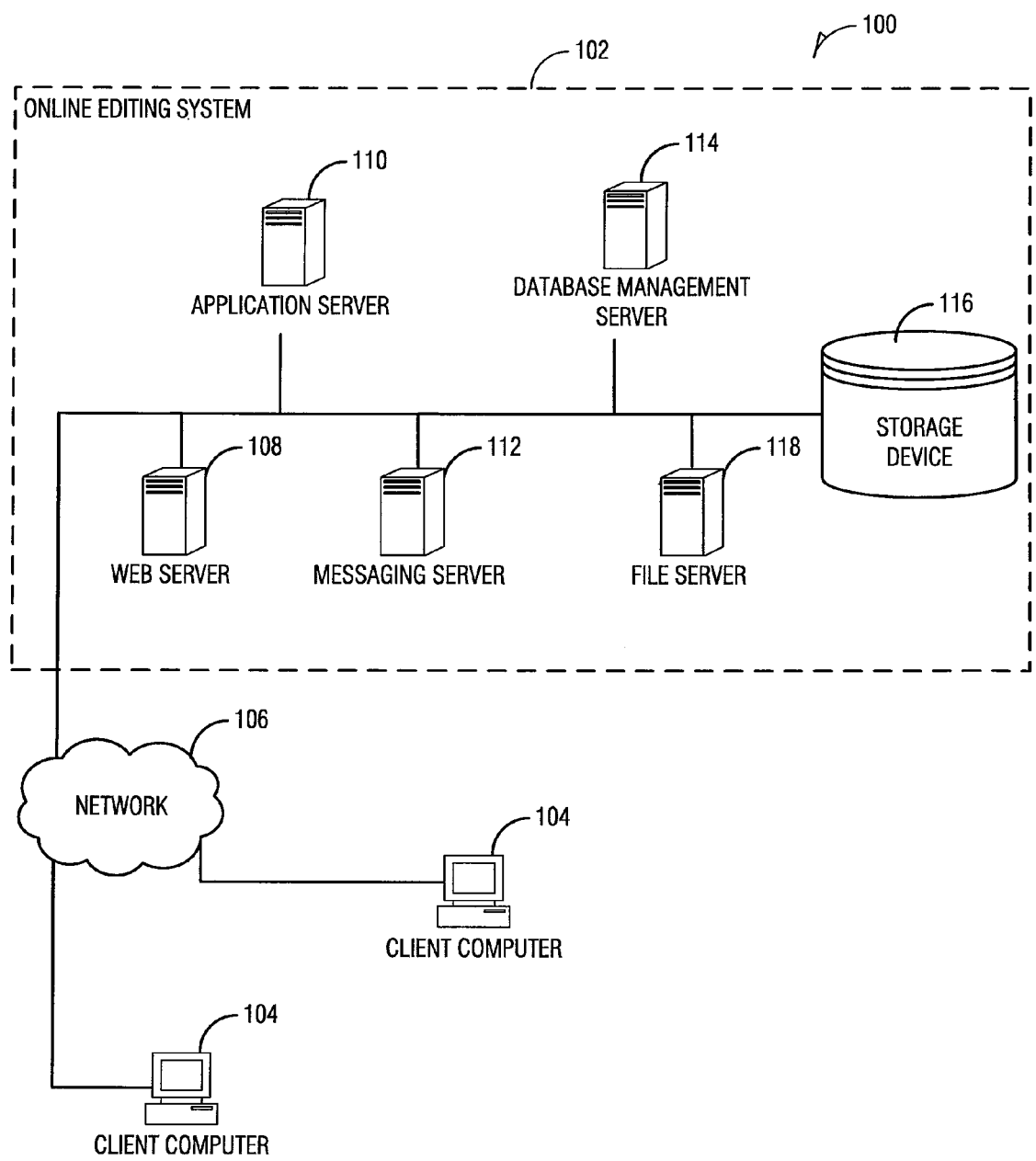
FIG. 1 is a schematic diagram illustrating a computer network system, according to an example embodiment, having a client-server architecture.

For the purposes of this specification, the term "electronic document" includes any electronic media content. Examples of electronic documents include, but are not limited to, word processing files, image files, multimedia presentation files, audio recordings, video recordings, spreadsheet files, database files, rendered documents, and page descriptive formats. An electronic document may include any electronic content (e.g., digital data) that may be presented to a user (e.g., visually or audibly presented). In some embodiments, electronic content may include static content, such as text, pictures, drawing objects, tables, and the like. In some embodiments, electronic content may include dynamic content, such as a video recording, a movie, a documentary, a video sample clip, animation, and other like electronic content. In some embodiments, electronic documents may include a mixture of static and dynamic electronic content.

A "content element" shall include any part or share of electronic content that is defined or discernable as a part or share. For example, a content element may be automatically discerned from a characteristic of the content element itself (e.g., a paragraph of an electronic document, or a file format designation) or may be manually defined by a user (e.g., a user-selected collection of words in an electronic document or a user-selected portion of a digital image). Other examples of content elements include portions of a page-descriptive document or other electronic document, such as, for example, pieces of electronic text or other material within the electronic document, dynamic content in the form of portions of media streams such as sections of digital video or frames or sets of frames of digital video or digital audio, dynamic content in the form of segments or frames of animations, electronic forms, form templates, form elements, form data, actuatable element specifications or executable instructions.

Content elements may include format data such as, for example, position information describing the placement of other content elements, or information specifying colors or fonts to be used in rendering other content elements.

For the purposes of this specification, a content item may be "associated" with electronic content. Examples of such association comprise inclusion within a file or other data structure containing the electronic content, the presence of a direct or indirect reference to the content element within electronic content, or the presence of a data structure, file, or other mechanism by which a content element is associated with electronic content. The association of a content element with electronic content does not necessarily require that when the electronic content is presented (or otherwise made accessible to a user or as input to a machine), that the content element is, in the course of presentation or access, also presented or made accessible. Content elements may be hidden from a user due to the location of a viewport, for example.

In considering the association between electronic content and an associated content element, the term "literally included" may be used. In this specification, electronic content may, for example, literally include a content element if the data structure that describes the electronic content includes data that largely describes the content element. In some embodiments, a content element may be associated with electronic content by reference, wherein the data that describes the content element is not directly contained within or integral with the data that describes the electronic content with which the element is associated.

A "comment object" may be associated with one or more content elements in an electronic document. A comment object includes a data structure, which includes an action field, a unique identifier field, a reference specification field, and a comment content field, in an embodiment.

The "action" field may be used to indicate a particular action associated with the comment object. Actions may include operations such as "add," "delete," or "revise" indicating that the system is to add, delete, or revise a comment object in an electronic document, and then potentially propagate the updated comment object to other open copies of the electronic document.

The "unique identifier" field is used to uniquely identify a comment object. The unique identifier may be a local unique identifier (e.g., unique within an electronic document) or a global unique identifier (e.g., unique within an online editing and publication system). When a unique identifier is locally unique, additional properties may be used to transform the use of the identifier to a larger scope (e.g., global). For example, an electronic document identifier may be used in combination with the locally unique identifier to provide such a transformation. The electronic document identifier may be, for example, used in a hash function with the local comment object identifier, concatenated with the local comment object identifier, or otherwise incorporated or integrated with the local comment object identifier to create a global unique identifier.

The "reference specification" field is used to provide a reference to the portion of the electronic document associated with the comment. In an embodiment, the reference specification field contains two pieces of information: a numeric identification and context information. The numeric identification uses discrete portions of the electronic document, which may align with content elements, to describe the beginning and the ending of the portion associated with the comment. For example, in a word processing document, a numeric identification may be recited as "4,5,17" to indicate that the beginning of the commented section is at paragraph 4, line 5, character 17. As another example, in a spreadsheet document, a numeric identification may be recited as "8,4" to indicate that the comment is associated with the cell located at the $8^{th}$ row and the $4^{th}$ column. Other numerical identifications may be designed and used as is appropriate in light of the type of electronic document containing the comment and the types of content elements described within the document.

The context information in the reference specification field is used to further identify the beginning or ending of a commented portion of an electronic document. For example, in a word processing document, the content information may be "beginning with the text 'annual report from' and ending with the text 'other matters.'"

By having both the numeric identification information and the context information, the exact location of the beginning and the ending of the commented portion may be more reliably ascertained. For example, in a word processing document, when attempting to identify the commented portion of an electronic document, a system may first use the numerical identification, and then to verify the location is correct, the system may use the context information. If the text corresponding with the context information is not found at the position provided by the numerical identification, a search is performed, first at the paragraph-level, then at the page-level, and finally at the document-level, for the phrase contained in the context information. If the phrase is not found at the document-level, then the phrase is deconstructed and portions of the phrase are used to search at the various levels until a match is found. As an example of phrase deconstruction, suppose that the original phrase was "There was one." A first iteration of phrase deconstruction may truncate the last word "one" and search the paragraph, page, and document for the sub-phrase "There was." Should these searches fail, then additional iterations may further reduce the phrase to "There", "Ther", "The", "Th", and finally "T."

The "comment content" field is used to contain the comments associated with the comment object data structure. Additionally, the comment content field may include references to comment content. The comments may take various forms including, but not limited to, text, drawings, pictures, graphics, audio, video, multimedia, or the like. For example, a reviewer may insert a comment object into an electronic document that includes a text comment and an audio clip with a discussion of the commented section by the author with other reviewers. As another example, a comment object may include other objects in the comment content field, such as another comment object, an email object, a word processing document object, a web page object, a spreadsheet object, or other types of modular objects. In an example embodiment, a comment content field includes a fully-realized word processing document, including elements, such as text, pictures, tables, graphs, artwork, comments, and the like.

The comment object data structure may vary depending on the specifics of a particular implementation. It is understood that variances in the data structure, the field names, field types, and other constraints (e.g., field size, field validation, primary or foreign key designation, etc.) are within the scope of this disclosure.

For the purposes of this specification, the term "rendering" used as a verb includes presenting or making accessible electronic content or content elements to be perceived, viewed, or otherwise experienced by a user, or be made available for further processing, such as, for example, searching, digesting, printing, analyzing, distilling, or transforming by computational processes that may not include processing the intrinsic data structure describing the electronic content or content element. Whether a content element associated with electronic content is included in the rendering of the electronic content may, by default, be determined by whether or not the content element is active.

For the purposes of this specification, the term "rendering" used as a noun includes human-perceivable representations of data that is within a machine and perception-specialized organizations of data defining such representations. For example, a rendering may include a pattern of human-perceivable matter or energy presented on an output device (e.g., a display) by a machine, as well as the organization of data within a machine that defines such patterns. For example, such organizations of data may include the electronic configuration of a memory used by a graphics display processor, or a file containing an audio segment suitable for playing via an audio system of a computer.

For the purposes of this specification, the term "rendering module" may be taken to include systems, applications, and mechanisms for rendering or presenting electronic content to a user, including the presentation of content elements such as text, graphics, form element renderings and other electronic content elements. An example of a rendering module includes a web browser component (e.g., Microsoft Internet Explorer) or other component to render electronic content, such as HTML pages. Another example of a rendering module includes the ADOBE® ACROBAT® electronic publishing program. Other examples of a rendering module include the ADOBE® FLASH® Player program, as well as the Microsoft® Silverlight™ browser plug-in.

For the purposes of this specification, the term "rendering program" includes applications for rendering or presenting dynamic content to a user. An example of a rendering program is the ADOBE® FLASH® Player 9 runtime software application. In many embodiments, a rendering module interacts with a rendering program to render dynamic content.

For the purposes of this specification, the term "online application" includes software applications that are provided in a networked, online environment. The software applications may have a client-server architecture, a peer-to-peer architecture, a distributed architecture, or other architectures using network infrastructures. In a client-server architecture, one example includes a web browser acting as the client and a web server acting as the server. Additional servers may be included to assist the web server in fulfilling its role, such as database servers, file servers, and the like. Online applications can include variations, such as web-based applications, thin-client applications, proprietary applications, or hybrid applications. Although many examples described herein are discussed in terms of a web-based application, this specification is not limited to these types of applications, but instead may be implemented as any variation of an online application.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or computational object to achieve a particular function, operation, processing, or procedure.

Introduction

In many situations, people viewing an electronic document may desire to create, edit, or remove a comment pertaining to some content in the electronic document. In an example embodiment, an electronic document may be shared among several people to review the content. In such an embodiment, each person may be provided controls to add, remove, or edit comments and relate such comments to portions of the electronic document. Several challenges present themselves in this multiple-reviewer context. For example, efficient organization of comments from each reviewer and dynamically updating comments in each open document as a reviewer inserts, updates, or removes a comment. Additionally, to assist reviewers, an organized, efficient, and intuitive user interface is desirable.

For example, in a web-based word processing application, one user may author a document and then provide access to one or more other users to review, comment, edit, or otherwise contribute to the further development of the document. One form of contribution may include inserting comments into the document. When one reviewer inserts a comment, rather than wait for the reviewer to save the document by other means (e.g., closing the document, manually saving the document, or by an automatic process) the comments may be automatically propagated to other versions of the document open at the time by other reviewers or the author. This type of asynchronous comment updating provides a more fluid collaborative environment. Example embodiments described below illustrate various systems and methods to achieve this type of collaborative environment.

One or more users (or other actors, such as automated processes) may be provided interfaces to view or review electronic content. In some embodiments, a review may be carried out by one person or by a team including multiple persons.

During the course of review activity, the user may be presented with a rendering of various content elements (e.g., using an output device, such as a display) included or otherwise associated with the electronic content. In some embodiments, these content elements may be presented in a sequential order so as to indicate their positions or interrelationships within the electronic content, or for ease of user perception.

Various types of content elements contained within electronic content may be presented to a user on an output device in various ways according to the nature of the content elements and/or the preferences of users. For example, electronic content representing an electronic document may be presented on a display screen in the form of renderings of pages as they might appear if the electronic document were to be printed out. As another example, an electronic document may be played in a playback program, such as a video player or an audio player.

In some such embodiments, the user may use a mouse, keyboard, touch pad, voice input or other input devices to explore the electronic document. The application may provide affordances (user interface controls) such as scroll bars, fast forward/reverse scan buttons, or other graphical user interface (GUI) elements to be manipulated by the user to explore and manipulate the electronic document. For example, this type of document control may be used when the entire electronic document is too large to conveniently display on a computer screen at one time.

The mechanisms and systems described herein for commenting are not limited to static electronic documents (e.g., word processing documents), but may also be implemented for dynamic electronic documents (e.g., video). For example, a user wishing to review a portion of dynamic content including video information may, in some embodiments, open a video viewing application, move a GUI affordance (e.g., a slider) to a position in the video representing the initial video frame to be presented, indicate that a comment is to be attached to that frame, and provide a comment to be associated with the video frame. In another embodiment, the user may be provided controls to associate a comment with more than one video frame (e.g., a video sequence). Other example embodiments are illustrated and described in the following sections.

System Overview

FIG. 1 is a schematic diagram illustrating a computer network system 100, according to an example embodiment, having a client-server architecture. The computer network system 100 includes an online editing system 102 and one or more client computers 104, communicatively coupled via a network 106. In an embodiment, the online editing system 102 includes a web server 108, an application server 110, a messaging server 112, a database management server 114, which is used to manage at least a storage device 116, and a file server 118. The online editing system 102 may be implemented as a distributed system. For example, one or more elements of the online editing system 102 may be located across a wide-area network from other elements of the online editing system 102. As another example, a server (e.g., web server 108, file server 118, database management server 114) may represent a group of two or more servers, cooperating with each other, in providing a pooled, distributed, or redundant computing model.

The client computers 104 may include an electronic device in various forms, such as a mobile communication device (e.g., a PDA, a cellular phone, a smart phone, etc.), a laptop computer, a desktop computer, a dedicated client computing device (e.g., a kiosk), or other devices capable of network communication and visual presentation. In addition, the client computers 104 may include a thin-client, a thick-client, a fat client, a hybrid client, or other client model typically found in a client-server architecture.

The network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth® network) or other combinations or permutations of network protocols and network types. The network 106 may include a single local area network (LAN) or wide-area network (WAN), or combinations of LAN's or WAN's, such as the Internet. The various devices coupled to the network 106 may be coupled to the network 106 via one or more wired or wireless connections.

The web server 108 may communicate with the file server 118 to publish or serve files stored on the file server 118. The web server 108 may also communicate or interface with the application server 110 to enable web-based presentation of information. For example, the application server 110 may provide scripts, applications, or library files that support primary or auxiliary functionality of the web server 108 (e.g., multimedia, file transfer, or dynamic interface functions). In addition, the application server 110 may provide some or the entire interface for the web server 108 to communicate with one or more other servers in the market performance analysis system 102, e.g., the messaging server 112 or the database management server 114. The web server 108, either alone or in conjunction with one or more other computers in the market performance analysis system 102, may provide a user interface. The user interface may be implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™).

In an embodiment, the client computer 104 may include a client program (e.g., a rendering program or rendering module) to interface with the online editing system 102. The client program may include commercial software, custom software, open source software, freeware, shareware, or other types of software packages. In an embodiment, the client program includes a thin client designed to provide query and data manipulation tools for a user of the client computer 104. The client program may interact with a server program hosted by, for example, the web server 108 or the application server 110. Alternatively, the client program may interface with the database management server 114.

The storage device 116 may include a database, a memory, a disk, or similar devices. In an embodiment, the storage device 116 may comprise one or more logical or physical databases. For example, the storage device 116 may be viewed as a system of databases that when viewed as a compilation, represent a "storage device." Sub-databases in such a configuration may include a document database, a user database, a comment database, a document history database, an operations database, and the like. The storage device 116 may include a database implemented as a relational database, a centralized database, a distributed database, an object oriented database, or a flat database in various embodiments.

During operation, a user at a client computer 104 can access the online editing system 102 to view an electronic document. The electronic document may be stored, in whole or in part, at the storage device 116, file server 118, or web server 108, in various embodiments. If the user is an author or someone with editing rights, then the user may revise the document. While the user has the document open, one or more other users may access the document from one or more additional client computers 104.

Users accessing the document are provided user interface controls (affordances) to insert, revise, or remove comments in the document. The online editing system 102 is capable of synchronizing the comments inserted, revised, or removed by one user in a document with copies of the document opened by other users. The synchronization may happen at various times, including at the time a document is saved, at the time of document access, at a timed interval, at a preset interval, at a user's request, or at the time the comment was inserted, revised, or removed, in example embodiments.

While the system 100 shown in FIG. 1 employs a client-server architecture, the present invention is of course not limited to such an architecture, and could equally well find application in a distributed, or peer-to-peer, architecture system, for example. Additionally, while various computers and storage devices are illustrated as separate components in FIG. 1, it is understood that functionality of these components may be merged, distributed, or otherwise organized into different configurations, depending on the implementations due to design preferences, cost restrictions, geographical limitations, or other business, technical, or practical considerations.

Thus, the following paragraphs present only some of many potential embodiments that can be used in this respect.

User Interfaces for Managing Comments

Figure 2:
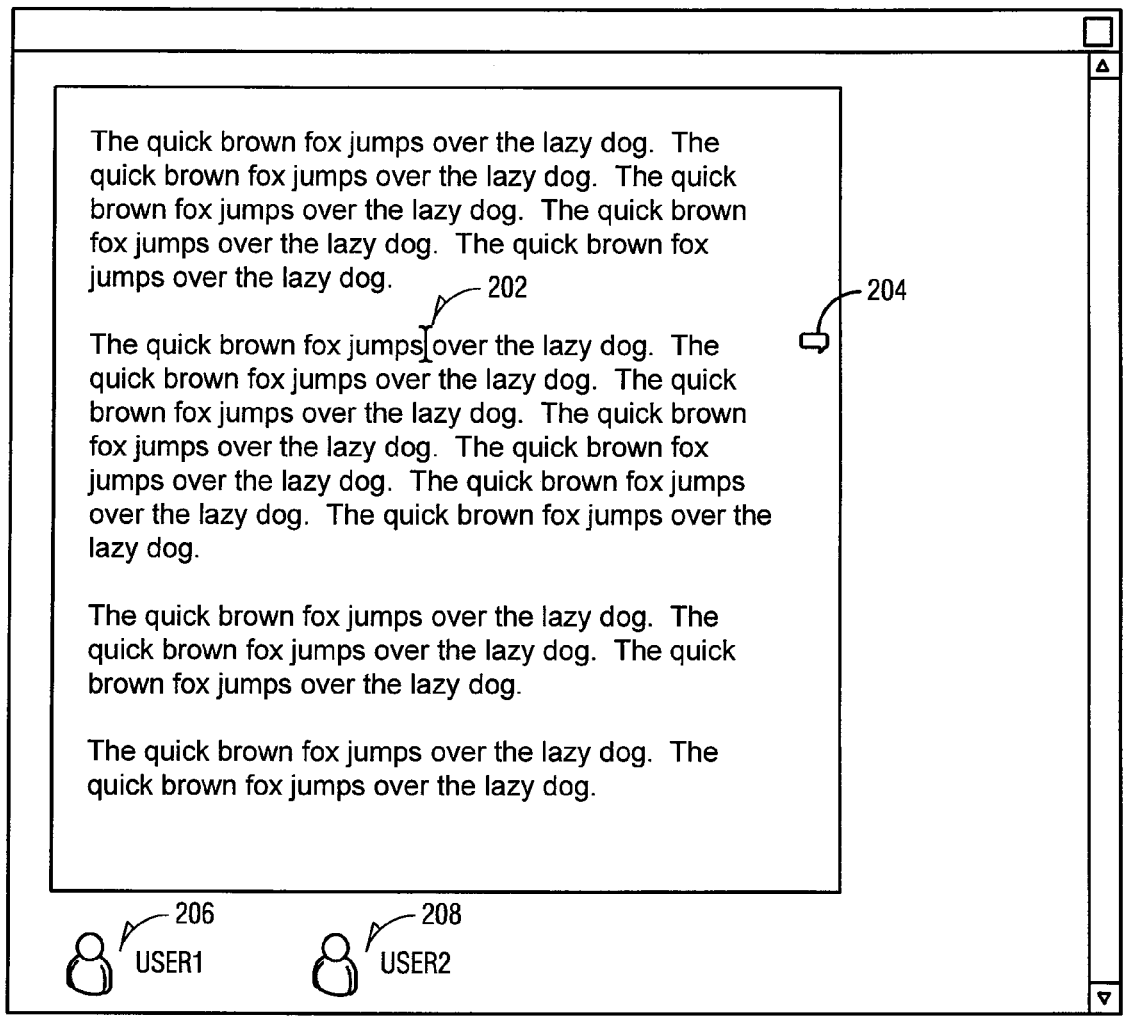
FIGS. 2-5 are diagrams illustrating a graphical user interface, according to example embodiments.

FIG. 2 is a diagram illustrating a graphical user interface 200, according to example embodiments. In the embodiment illustrated, a portion of text is displayed in a window. A cursor insertion point 202 is illustrated in the first sentence of the second paragraph of the text. A user interface control 204 is illustrated in the right margin at approximately the same vertical placement as the cursor insertion point 202. It is understood that the cursor insertion point 202 may be manipulated in various ways through the use of keyboard actions or mouse actions, or a combination of the two. When a user (not shown) manipulates the cursor insertion point 202 through the use of these mechanisms, the user interface control 204 is dynamically repositioned to correspond with the position of the cursor insertion point 202. Additionally, the cursor insertion point 202 may be generally thought of as an "active point of editing" in an electronic document and does not necessarily have to be represented using a cursor. Those of ordinary skill in the art will recognize various mechanisms to track and present the active point of editing and use such information to implement the methods and systems described herein.

The user interface control 204 may be shaped or designed to convey a functional meaning (e.g., an affordance). As illustrated in FIGS. 2-5, the user interface control 204 is shaped like a "speech balloon" as seen in comic books, comic strips, and cartoons. In such a configuration, the user interface control 204 may be referred to as a "commenting tool." A commenting tool in the context of this specification includes user interface controls that provide the functionality of inserting, revising, removing, or otherwise managing comments. Other shapes or designs may be used depending on the functionality of the user interface control 204.

Additionally, in some embodiments, the user interface control 204 is configured to provide multiple functions. For example, when a user clicks on the user interface control 204, a dropdown menu may be displayed where the user can access functions, such as "Insert Comment," "Insert Table," or "Insert Image." Additionally, in some embodiments, the shape or design of the user interface control 204 is changed when functionality available via the user interface control 204 is added or removed. For example, when the functionality is limited to inserting comments, the user interface control 204 may be presented as a speech balloon icon and the user interface control 204 may be referred to as a commenting tool. When the functionality changes to allow the user to insert comments and images, the user interface control 204 may be changed to a picture frame icon or to some other icon indicating the changed functionality. In an embodiment, the user interface control 204 is animated and may display multiple icons in sequence (e.g., looping between a speech balloon and a picture frame) or an animated icon (e.g., an arrow moving into a document icon).

Additionally, in some embodiments, the functions available via the user interface control 204 are altered based on the position of the cursor insertion point, a type of object containing the cursor insertion point, a user type, a keystroke modifier, or other environmental or contextual criteria.

The cursor insertion point 202 may be detected in various content elements, which may affect the configuration of the user interface control 204. As an example, the user interface control 204 may provide an "Insert Table" function when the cursor insertion point 202 is detected in a block of text. The "Insert Table" function may be removed when the cursor is detected in a table cell (in a case where embedding tables within tables is not supported by an application).

As another example, the user interface control 204 may be altered when the cursor insertion point 202 is used to define a selection (e.g., click and drag). For example, the user interface control 204 may be modified to provide an "Insert Image" function when the cursor insertion point 202 is not used to define a selection. When the cursor insertion point 202 is used to define a selection then the "Insert Image" function may be removed from the user interface control 204.

Additionally, each user may be associated with one or more user types. User types may include roles related to access privileges, such as "Reviewer," "Author," "Reader," and the like. User types may also include roles related to security levels, such as "Administrator," "User," "Owner," "Guest," and the like. User types may be specific to an online application. The user type may then be determined and used by a system to alter the presentation of the user interface control 204. For example, Authors may be permitted to insert images and comments using the user interface control 204, whereas Reviewers may only be permitted to insert comments.

Keystroke modifiers may also be used to modify a user interface control 204. For example, when depressing the SHIFT key and hovering over the user interface control 204 with a mouse cursor, the resulting dropdown contextual menu may change to include more or fewer functions. Keystroke modifiers may be configurable, for example, by the user or an administrator.

At the bottom of the displayed interface 200, icons and associated text are displayed corresponding to the users currently viewing the electronic document. In the example embodiment shown in FIG. 2, USER1 206 and USER2 208 are viewing the document. For the purposes of this discussion, USER1 206 is being presented the user interface illustrated in FIGS. 2-5, while USER2 208 is a remote user who may be viewing, editing, reviewing, or authoring the electronic document. While not shown, it is understood that one of ordinary skill would be able to extend the use of the bottom display area to include other information about the users presently viewing the document. For example, each user's role may be presented. The users may be presented using unique colors to separately identify each user or each user's role, in various embodiments.

Figure 3:
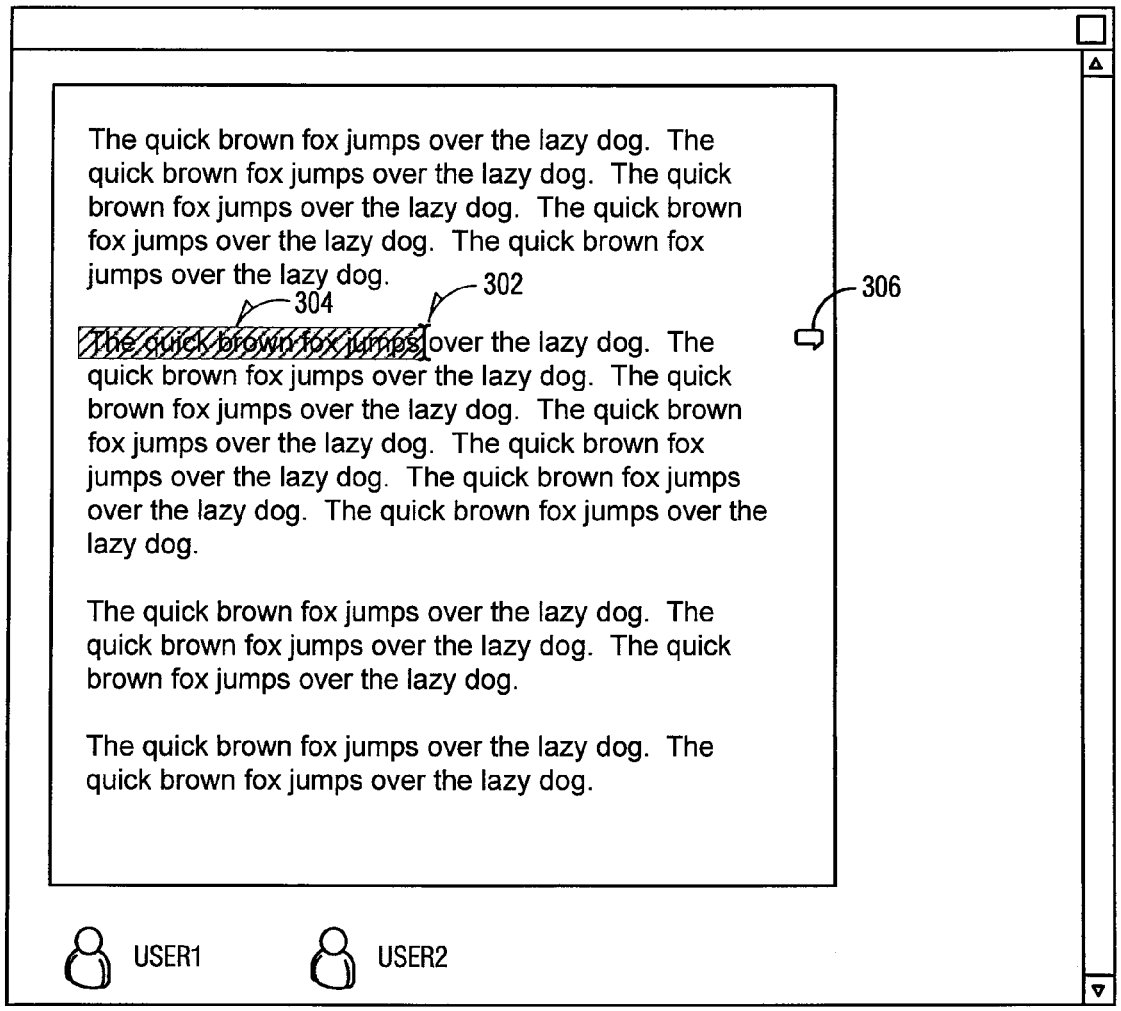

FIG. 3 is a diagram illustrating a graphical user interface 300, according to example embodiments. FIG. 3 is an illustration of the state of the display screen at the point in which the user has selected a portion of a paragraph. The cursor insertion point 302 is positioned at the tail end of the selection 304, indicating a selection made by starting with the beginning of the sentence, and ending at the cursor insertion point 302. It is understood that the user may also click-and-drag to make a selection in the reverse direction—beginning at a latter portion of the text and ending at an earlier portion. In this case, the cursor insertion point 302 would be positioned at the beginning portion of the selection 304. The user interface control 306 is rendered in a position (e.g., a horizontal or vertical position) in the display corresponding to the cursor insertion point 302. In the example shown, the user interface control 306 is said to correspond to the cursor insertion point 302 in that the user interface control 306 is displayed at the same vertical position as the cursor insertion point 302 in the electronic document.

Figure 4:
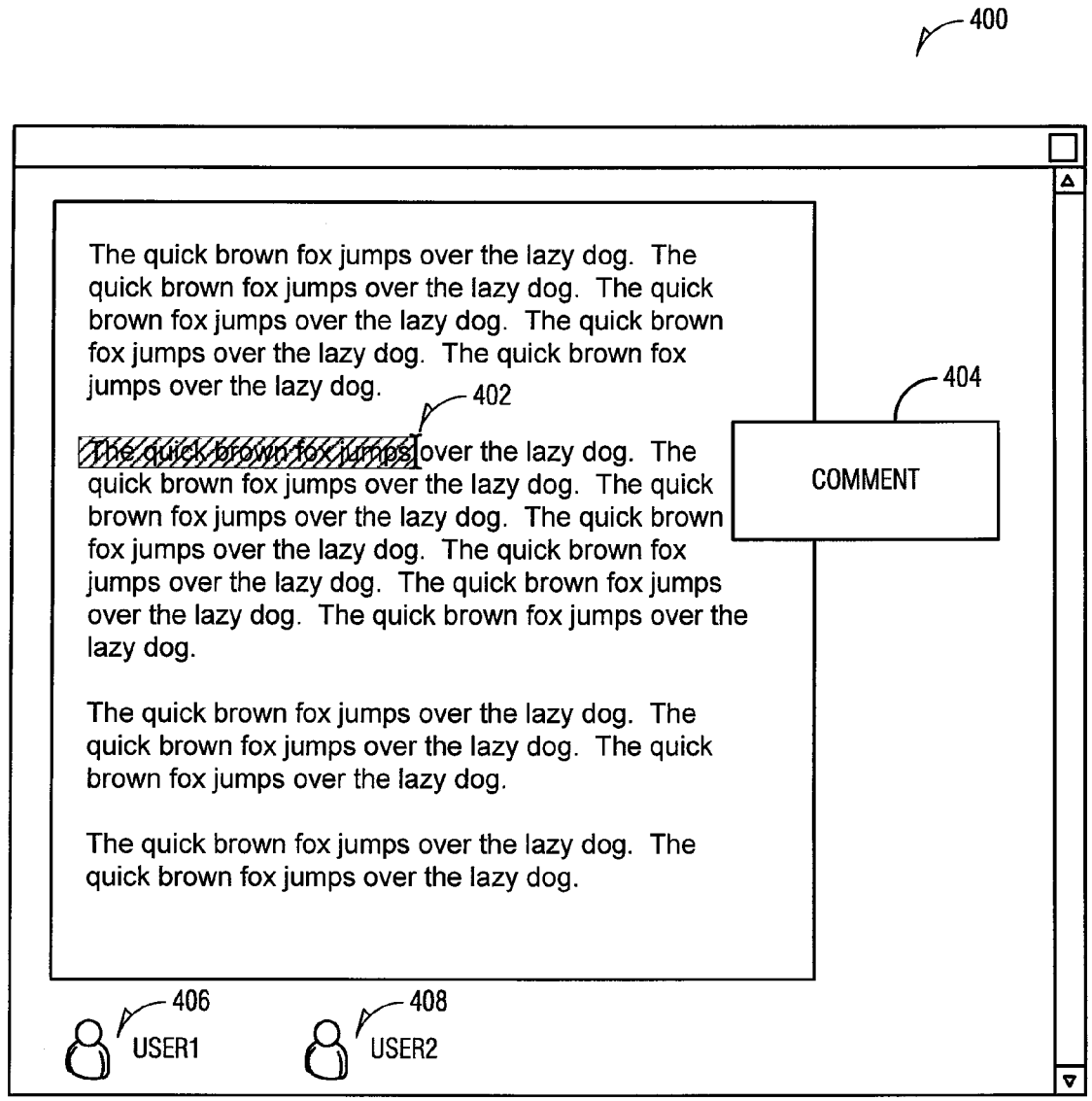

FIG. 4 is a diagram illustrating a graphical user interface 400, according to example embodiments. FIG. 4 is an illustration of the state of the display screen after the user interface control has been actuated to create a new comment. In FIG. 4, the cursor insertion point 402 remains at the tail end of the selection portion. A comment window 404 is displayed in a position (e.g., a horizontal or vertical position) corresponding to the cursor insertion point 402.

Figure 5:
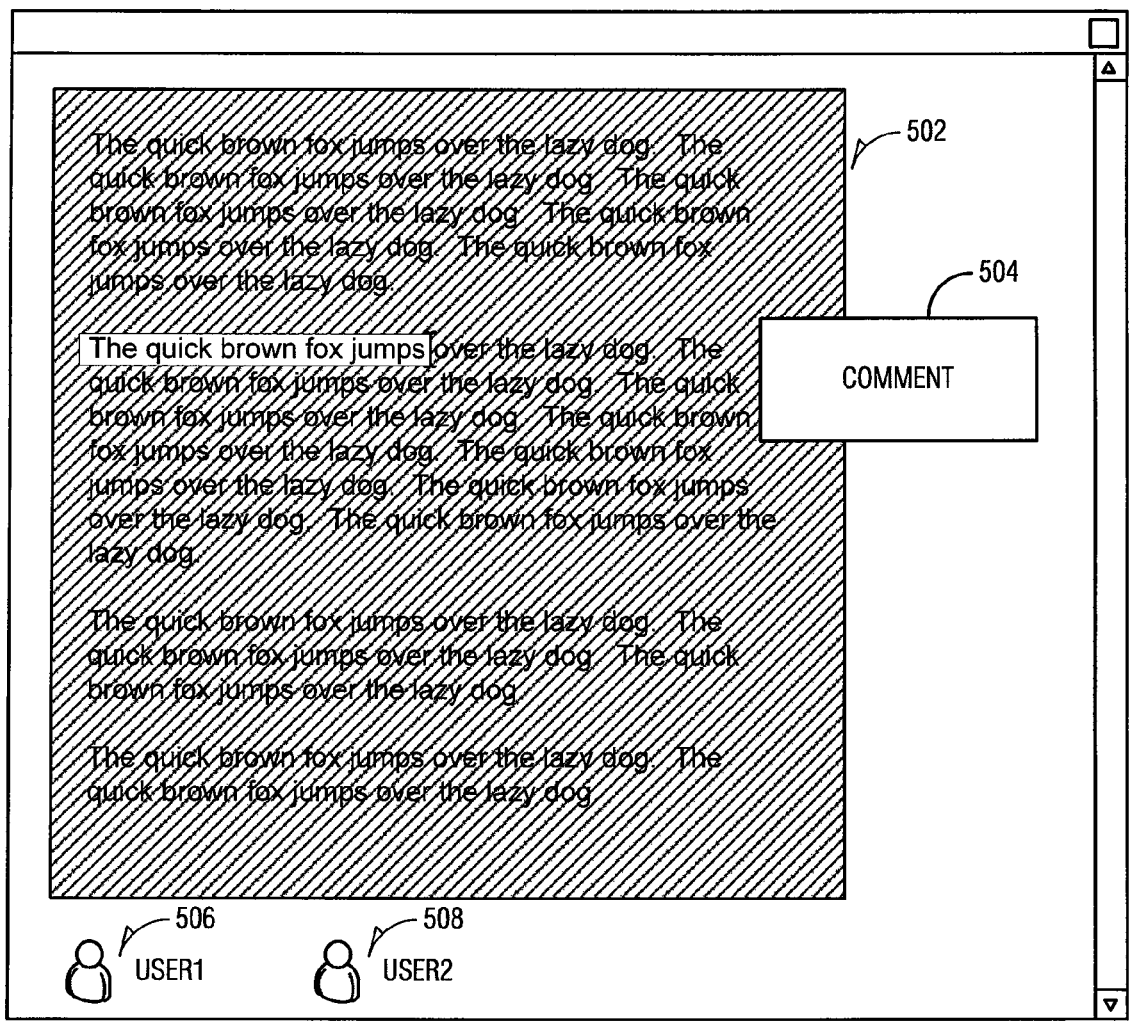

FIG. 5 is a diagram illustrating a graphical user interface 500, according to example embodiments. FIG. 5 is an illustration of the state of the display screen after the user has activated the user interface control (e.g., control 306 in FIG. 3) and the comment window 504 is displayed. In an embodiment, after the comment window 504 is displayed, a cursor insertion point is automatically positioned in the comment 504, for example, in a comment content field. In an embodiment, the comment 504 displays other information, such as the time and date the comment 504 was created or updated, and a user identifier indicating the author or editor of the comment. Other types of information may be presented using the comment 504, for example, the comment 504 may include a border that is color-coded to match users (506, 508) displayed at the bottom of the interface. The color-coding provides a quick visual method to correlate comments with users.

When a comment is being edited, such as when creating a new comment or revising an existing one, a mask 502 is displayed to partially obscure the text not related to the comment. The mask 502 may be displayed at varying levels of translucence, ranging from completely opaque (e.g., 100% shading) to nearly transparent (e.g., 5% shading). Different levels of translucence may provide different advantages to a viewing user. For example, a less translucent shading (e.g., 95%) may allow the user easier viewing of the comment and the associated material with less distraction, whereas a more translucent shading (e.g., 10%) may allow the user to see the surrounding context of the commented material and better understand the nature of the comment or the commented material. In an embodiment, the level of transparency is a configurable value, which may be set by the user, an administrator, an author, or by automatic means.

The mask may be implemented using shading or dimming transition effects, in some embodiments. Shading or dimming may also be referred to as a fade-in or fade-out effect. In an example embodiment, the shading may be applied using a user-configurable number of shading levels (e.g., 10) to progress from transparency to the final level of translucency or opaqueness.

When a comment 504 is selected, other indicia may be provided to correlate the comment 504 with the related content. In an embodiment, the comment 504 may include a colored border and the commented content may be presented using the same color. For example, the text may be underlined using a line of the same color, the text color may be altered to match the color of the border, or the text may be highlighted using a matching color.

In an embodiment, when two or more comments exist in an electronic document, the viewing user may select more than one comment. Selection of a comment may be performed by a mouse click, a keyboard command, or other input device actuation. In addition, selection may be provided using a combination of such inputs (e.g., depressing the CONTROL key on a keyboard and then clicking a mouse button while the key is depressed). Selection of multiple comments may be performed by other available user interface actuations, such as depressing and holding the SHIFT key while clicking on several comment boxes in an electronic document to select each comment box clicked. When a user selects multiple comments, in an embodiment, as with the window displayed in FIG. 5, a mask may be applied to the content not associated with any of the selected comments.

Although a number of data structure details are presented above, it will be appreciated that processes and systems (e.g., rendering modules including or using various modules) described in this specification may be implemented using a variety of different data structures and data storage mechanisms. For example, in some embodiments, map-type or key/value-structured data structures may be used where the map key may be used as the reference to a particular user and the data associated with the key may include a list of the portions of the electronic content that have been commented by the reviewer. In some embodiments, maps may be used to combine review progress information from various users.

Methods for Managing Comments

Figure 6:
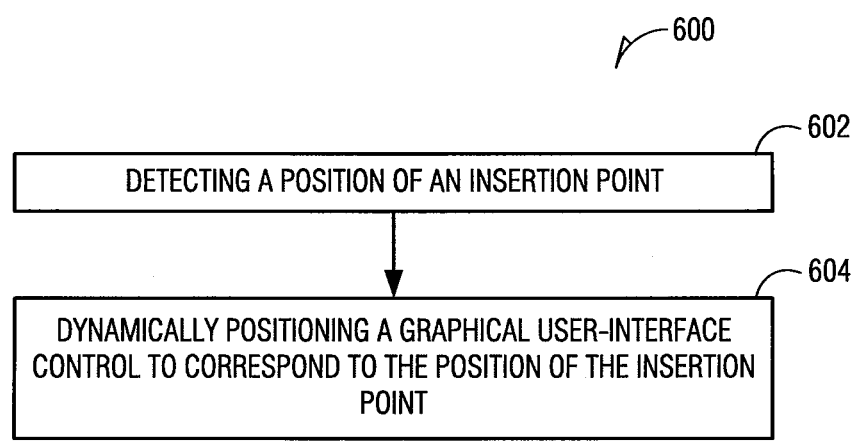
FIG. 6 is a flow chart illustrating a method, according to an example embodiment, to display a user interface control.

FIG. 6 is a flow chart illustrating a method 600, according to an example embodiment, to display a graphical user interface (GUI) control. In an embodiment, the GUI control includes an icon indicative of a function accessible via the GUI control. At 602, a position of an insertion point is detected. The insertion point may be represented by a cursor, in some embodiments. The detection may occur at regular intervals (e.g., 10 times a second) or be triggered upon a keyboard or mouse actuation, for example.

At 604, a GUI control is dynamically positioned in a position corresponding to the position of the insertion point. For the purposes of this specification, "dynamically positioned" or "dynamically repositioned" comprises positioning a graphical user interface control where the user interface control is always present in some form and tracks, or follows, the position of the insertion point in the electronic document.

In an embodiment, the GUI control is presented in a margin of the electronic document. In a further embodiment, the GUI control is presented in a vertical position aligning with the insertion point. The position of the GUI control is configurable in some embodiments. For example, the GUI control may be positioned in the left margin or the right margin, depending on a user's preference.

In an embodiment, the GUI control may be referred to as a commenting tool, because the GUI control is used for creation, revision, deletion, or otherwise managing comments in an electronic document.

In a further embodiment, the method 600 may also include receiving an indication that the GUI control was activated, creating a comment object, associating the comment object with the insertion point, and presenting the comment object in the GUI. The indication may comprise an event, for example, in event-driven applications. As another example, the indication may comprise a message, packet, or other communication from a client to a server. Creating the comment object may involve several actions, such as allocating memory, defining a row in a database table, calling a stored procedure in a database, calling an Application Programming Interface (API) function, or the like. The comment object may have a data structure, such as one described above. Associating the comment object with the insertion point may include actions to populate a comment specification field, as described above, with particular information to uniquely identify the portion of the electronic document associated with the comment object.

In a further embodiment, the method 600 may also include applying a mask to the electronic document, except for content that corresponds to the comment object. Masking the content not associated with the selected comment is discussed above with respect to FIGS. 2-5. Masking the content may comprise visually obscuring content in the electronic document not associated with the comment. The mask may be implemented using shading or dimming transition effects. The shading or dimming transition effect may include using one or more shading levels, which may be user-configurable, in some embodiments.

In a further embodiment, the method 600 may also include receiving an indication that the GUI control was accessed and, in response, presenting a context-sensitive menu. For example, the GUI control may be accessed by moving a mouse cursor over the GUI control, clicking on the GUI control, or using a keyboard shortcut to access the GUI control, in various embodiments.

In a further embodiment, presenting the context-sensitive menu may include determining whether the insertion point defines a selection and configuring the GUI control depending on whether the insertion point defines a selection.

In an embodiment, the context-sensitive menu is configured using various criteria, such as, the position of the insertion point, a type of object containing the insertion point, a user type, a user, or a keystroke modifier. These criteria may used additively, in some embodiments. The context-sensitive menu may be configured as a popup menu, in some embodiments.

In a further embodiment, the method 600 may also include presenting the electronic document using an online web application. Online applications, including online web applications, may comprise office-type applications (e.g., word processing, spreadsheets, presentation software), specialized applications (e.g., medical records, architectural drafting, circuit design), or multimedia applications (e.g., video editing, audio mixing), in various embodiments.

In a further embodiment, the method 600 may also include detecting a change of position of the insertion point and then repositioning the GUI control to correspond with the changed position. Tracking positional changes may be performed periodically. The period may vary from very small periods (e.g., milliseconds or microseconds) to larger periods (e.g., tenths of a second, or a full second between updates).

Figure 7:
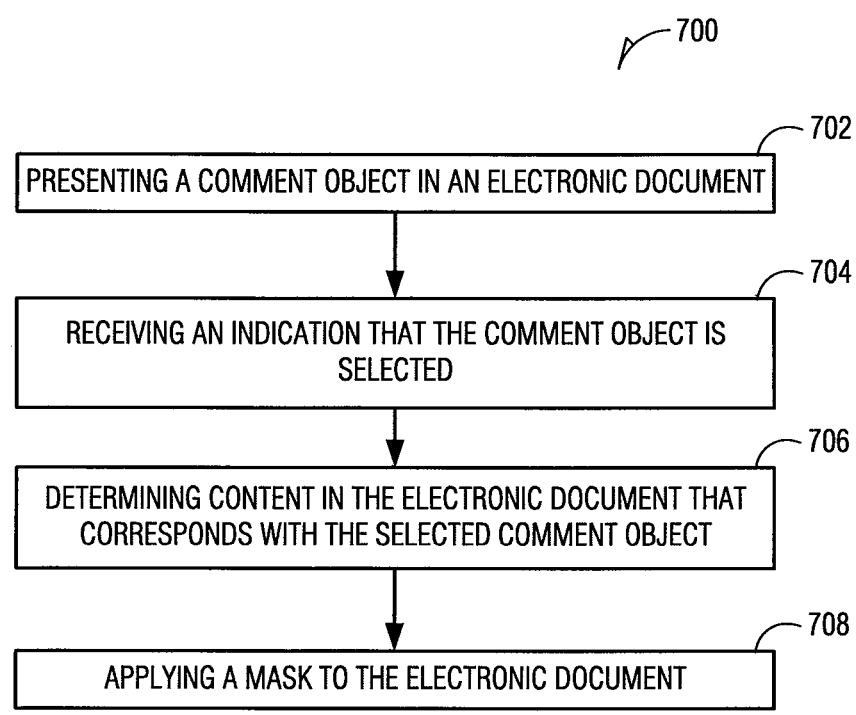
FIG. 7 is a flow chart illustrating a method, according to an example embodiment, to display comments in an electronic document.

While FIG. 6 describes a method 600 of displaying a GUI control to insert comments into an electronic document, FIG. 7 described a method 700 to display existing comments and their associated content in an electronic document.

FIG. 7 is a flow chart illustrating a method 700, according to an example embodiment, to display comments in an electronic document. At 702, a comment object is presented in an electronic document. The comment object may represent a "user comment," that is, one created, edited, revised, or managed by a user of a system or application used to view, create, revise, or otherwise manage the electronic document. In an embodiment, the comment object is defined using a data structure and only portions of the data structure are presented to a user viewing the electronic document. For example, the comment object data structure may include a comment content field and a comment owner field, where the comment content field contains the content of the comment or a reference to the content of the comment, and where the comment owner field contains information described the author of the comment. Other information may also be included in the comment object data structure, such as an action field, a unique identifier field, and a reference specification field. These portions may not be directly displayed to a user, but they may be used to display the viewable portions of the comment. For example, the reference specification field may be used to highlight the portion of content associated with the comment object.

In an embodiment, presenting the comment object includes presenting the comment object using a color scheme that corresponds with an embellishment used on the content associated with the comment object (e.g., highlighting, underlining, font color, or other graphical effects). The color scheme may be keyed to one or more of a user type, a user, a comment type, a comment age, and a context type, in embodiments.

Users may be defined using user types, as described above, for example, as Administrators, Authors, Reviewers, or Guests. Users may also be defined by an identity (e.g., a login name, a username, or a user's actual name). Color schemes may vary based on the type of user. As an example, users of type "Reviewer" may have different color schemes than users of type "Author" to assist a reader to quickly ascertain the source of a comment.

Comments may include several types, for example, a general comment, a suggested revision comment, or a reply comment. A general comment may include static or dynamic content, such as text and audio, or text and video. General comments are comments that are inserted by one user to be viewed by other users. General comments have no functionality other than that to present the context of the comment.

Suggested revision comments are comments that include suggested changes to an electronic document. The comment may be presented using one or more GUI controls to allow a user with editing privileges to edit the electronic document using the suggested revision comment. For example, a comment may be presented with text that shows "The slow brown fox", where the suggested revision includes deleting the word "quick" and inserting the word "slow", as shown by the use of the strikethrough of the word "quick" and the underlining of the word "slow." The comment may also include additional text describing the suggested revision, such as "This is a change I think we need." In addition, the comment may include a GUI control (e.g., a button) labeled "Accept" and another GUI control labeled "Reject", where activating the Accept control will insert the change into the electronic document and activating the Reject control will delete the comment object.

A reply comment is a comment object created in response to a previously created comment. The reply comment may include the original comment's content and a response from a respondent user. The reply comment may only be viewable by the user who left the original comment. In addition, the reply comment may include a GUI control to allow the currently viewing user to respond to the reply comment. By activating the GUI control, the present user may create a new comment object with limited visibility, in particular, a comment that only the respondent user can view.

A color scheme may also be based on a content type. Content in an electronic document may be divided in categories, such as "text," "picture," "drawing," "video," or the like. Comments associated with a particular content type may use a color scheme unique to the content type.

At 704, an indication is received, where the indication provides that the comment object is currently selected. The indication may be provided by a mouse click, a keyboard event, or by other input from the user interface.

At 706, content in the electronic document that corresponds with the selected comment object is determined. This may be performed using the reference specification field from the comment object data structure.

At 708, a mask is applied to the electronic document. In an embodiment, the mask is a translucent mask. In a further embodiment, more than one comment may be selected and content associated with the selected comments is determined. A mask is then applied to any content that is not associated with the selected comments. The mask may be configurable, in an embodiment. For example, the translucency of the mask may be user-configurable (e.g., from 5% opacity to 100% opacity, in 5% intervals). As another example, the color of the translucent mask may be configured. The default color may be shades of gray, but the user may be able to configure the color to a personal favorite, such as shades of green. The mask may also be applied with a shading transition effect using one or more shading levels, which may be user-configurable, in some embodiments.

In a further embodiment, an author associated with the comment object being presented is determined. Using the author's identity, a GUI element representing the author's identity is highlighted or embellished. For example, each user viewing an online electronic document may be represented by an icon or a label identifying the user. As another example, each user may use a pictorial icon or graphical image as an avatar (a representation of the user). When a viewing user clicks on a comment to select the comment, the icon, label, or avatar associated with the user who is the author of the comment is highlighted or embellished. Various embellishments may include, for example, changing a text or font color, changing a border color, underlining a label, animating an avatar, or the like. For example, using a color scheme may emphasize the content or other user interface element, associated with a comment. In an example embodiment, the avatar of the author associated with a user comment is presented using a selected one of several available color schemes to highlight the avatar of the author and the user comment.

In a further embodiment, the electronic document is presented using an online web application.

Figure 8:
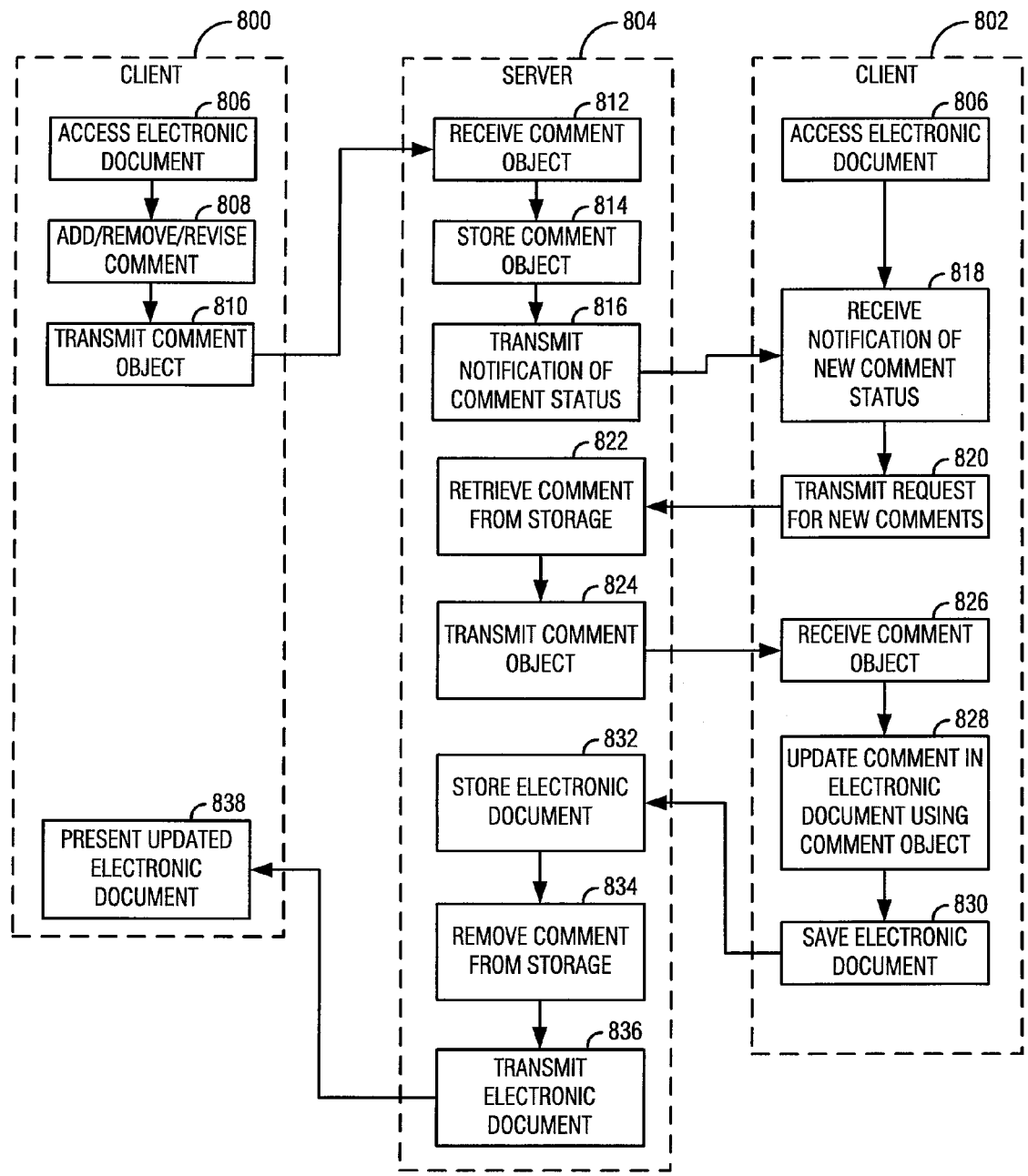
FIG. 8 is a data flow diagram illustrating a method, according to an example embodiment, to update comments asynchronously.

While FIGS. 6 and 7 describe comment display and interaction within a GUI, FIG. 8 describes the underlying mechanism used to update comments between several open copies of an electronic document.

FIG. 8 is a data flow diagram illustrating a method 800, according to an example embodiment, to update comments asynchronously. FIG. 8 includes a first client 800, a second client 802, and a server 804. In the embodiment illustrated in FIG. 8, the user of the first client 800 is a reviewer, editor, or other person with viewing and commenting rights within an electronic document. The user at the second client is an author, administrator, editor, or other person or process with full access rights to the electronic document. To facilitate sharing the electronic document, a server 804 is used.

At 806, the first client 800 and the second client 802 access the electronic document. The accesses 806 need not be simultaneous, in fact, in practice, one client may have the electronic document open for some time before another client accesses the document. For the purposes of this discussion, it does not matter which user opened the document first. In the embodiment illustrated, both clients have the document open concurrently, but the queuing mechanism described also works when users alternately open a document. This will be described in more detail below.

At 808, a user at the first client 800 adds, removes, or revises a comment in the electronic document. For example, the user may select a portion of the electronic document (e.g., a portion of text) and activate one or more user interface controls to insert a new comment object and then populate the comment object with comments. The comments may be textual, audio, multimedia, or the like. As another example, the user may remove (delete) a comment object from the electronic document.

At 810, the comment object is transmitted to the server 804. The comment object may have a defined data structure indicating, for example, the portion of the document associated with the comment, an action (e.g., revise, add, delete), a user identification, a date and time stamp, or the like.

At 812, the comment object is received at the server 804. At 814, the comment object is stored. The comment object may be parsed and stored in a storage element (e.g., see element 910 of FIG. 9).

At 816, a notification of the comment object's status is transmitted to the second client 802. At 818, the second client 802 receives the notification indicating the comment object's new status. At 820, the second client 802 transmits a request for the content associated with the comment object associated with the notification. In an embodiment, notifications received at block 818 are buffered, for example, for a period of time (e.g., 30 seconds) or until a threshold number of notifications are reached (e.g., 5). Use of buffering may increase network efficiency, but at the expense of real-time updates.

At 822, the comment object is retrieved from storage. At 824, the retrieved comment object is transmitted to the second client 802. At 826, the comment object is received at the second client. At 828, the electronic document is updated using the comment object. In an embodiment, the electronic document is updated in local memory at the second client 802.

At 830, the electronic document is saved. The electronic document may be saved by various actions by the user or by automatic means. For example, an express save occurs when the user accesses a "Save" function via the user interface (e.g., using a menu command). A passive save may occur at regular intervals (e.g., every 10 minutes) or at the occurrence of a trigger (e.g., after inactivity of 30 seconds). An indication of the save activity is sent to the server.

At 832, the saved electronic document is stored at the server. The electronic document may be stored in a database, at a file server, or at another storage device, in various embodiments.

At 834, the comment object is removed from storage. In an embodiment, the comment is removed from a comment list (e.g., element 912 of FIG. 9). The comment list may be implemented as a queue. In an example embodiment, each comment object placed in the comment list is assigned an incrementing number to ensure that each comment object can be uniquely identified. At a particular point in time, the comments that have not been integrated into the document are forwarded to the client (at 824). At this point, the largest unique identifier is stored. When the document is saved, the comments with unique identifiers up to and including the previously-stored largest unique identifier are removed from storage.

This mechanism allows for additional comments to be placed in the comment list prior to the document being saved. For example, before the document has been saved, additional comments may be received and placed in the comment list. As another example, requests for comments from the author's client device (at 820) may occur periodically. The use of the comment list and the unique identifiers maintains synchronicity between the document and the comments. Additionally, the comment list may be used to buffer comments until an author accesses the document, and subsequently fully incorporates the comments into the document. Until fully incorporated into the document, the comments may be read from the comment list and presented to a user for viewing, editing, or deleting. Before the comments are fully incorporated, the comments are stored separate from the document (e.g., in the comment list).

In an embodiment, the comment is marked as being incorporated, but may be saved in the storage element 910 for other uses, such as backup and restore, historical tracking, or as part of various analytics.

At 836, the updated and saved electronic document is transmitted to the first client. The saved electronic document is merged with the document being viewed at the first client. The merge process may incorporate comments from other users, update content, and otherwise synchronize the document with other changes to the document.

At 838, the first client uses the updated and saved electronic document to update the copy of the document being presented at the first client 800. A merge process is used in an embodiment to update the content of the electronic document being presented, which may include further edits, with the newly saved electronic document being pushed from the server.

Users may alternate opening and closing the document. For example, a user at the first client may open the document, modify a comment object, and close the document. A user at the second client may have opened the document after the user at the first client, such that a notification will be sent to the user at the second client. The user at the second client may then save the document, thus incorporating the comment into the document. Later, when the user at the first client opens the document again, the incorporated comment is retrieved and presented to the user. Additionally, another user at a third client may open the document after the user at the first client has added a comment. The user at the third client will also receive the updated version of the document when the user at the second client saves the documents with the integrated comments.

It should be noted that the methods described herein do not have to be executed in the order described, or in any particular order. Moreover, various activities described with respect to the methods identified herein can be executed in iterative, repetitive, serial, or parallel fashion. Activities within various methods may also be combined, to include combination across the various figures used herein. Information, including parameters, commands, operands, and other data, can be sent and received in the form of one or more carrier waves.

Systems for Managing Comments

Figure 9:
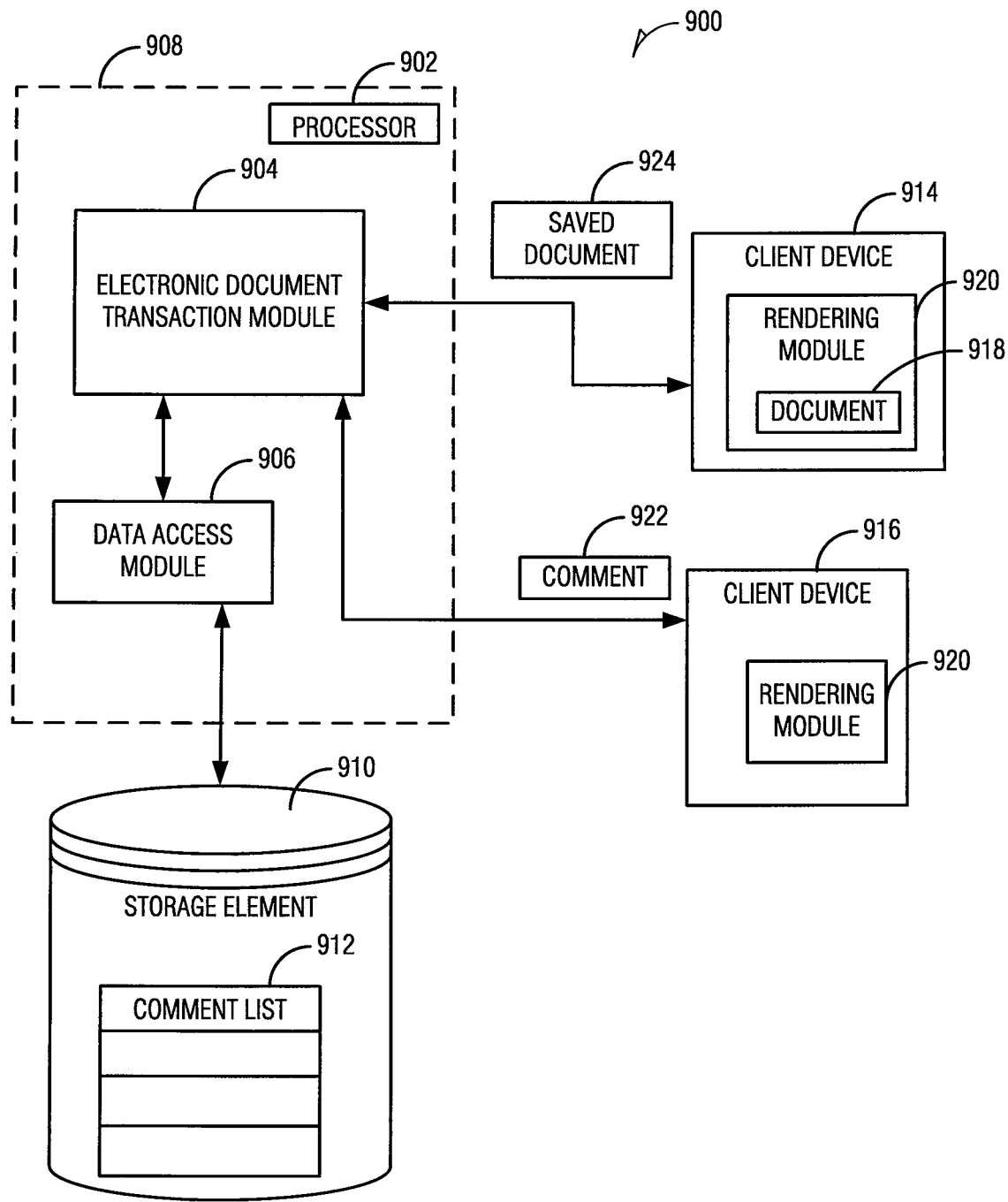
FIG. 9 is a block diagram of a system according to various embodiments.

FIG. 9 is a block diagram of a system 900, according to various embodiments. The system 900 may include a number of modules such as one or more processors 902, an electronic document transaction module 904, and a data access module 906. These modules (902, 904, 906) may be associated within a machine 908, as indicated by their containment within the dashed box. Those of ordinary skill in the art will understand that any of the modules (902, 904, 906) shown to be located within the confines of the machine 908 may also be located outside the machine 908, and appropriately coupled to the machine 908 via wired or wireless connections.

The electronic document transaction module 904 may be used to manage access requests, write operations, and other operations related to electronic documents stored at the system 900 or at auxiliary systems. In some embodiments, the electronic document transaction module 904 may include a web server, a database server, a transaction server, a business rules system, a customer relation management system, or combinations thereof. In general, the electronic document transaction module 904 allows users to create documents at the system 900, manage access rights to documents, edit existing documents (e.g., add, edit, or remove content or comments), and delete documents.

The data access module 906 may be used by the electronic document transaction module 904 to access a storage element 910. The storage element 910 may include memory devices such as a database, a memory, a disk, or other storage device.

The storage element 910 may serve to store electronic documents. The data access module 906 may operate to read from and/or write to the electronic documents and may provide reading and writing services for the benefit of other system modules, including the electronic document transaction module 904 and the processor 902. In addition, the storage element 910 may serve to store a comment list 912. The comment list 912 may be implemented using one or more database tables, in an embodiment. As described above, the comment list 912 may be implemented to synchronize comments across multiple open copies of an electronic document. For example, the comment list 912 may be implemented as a queue.

The data access module 906 may be present in some embodiments, and absent in others. When present, the data access module 906 may operate as a mediator between the various modules of the system 900.

The electronic document transaction module 904 may be operably coupled to an author client device 914 and a reviewer client device 916. The author and reviewer client devices 914, 916 may comprise devices, such as a computer, a display screen, a handheld portable device, a kiosk, or other client devices used to present or display an electronic document. The client devices 914, 916 may also be used to render the electronic document, for example, by using a client rendering module 920. Rendering may take the form of displaying a document 918. It is understood that the labels "reviewer client device" and "author client device" may be used interchangeably, in some embodiments, as a user who is a reviewer for one electronic document may be an author for a different one, and vice versa.

In an example embodiment, a user acting as a reviewer may operate a reviewer client device 916 may insert a comment 922 into an electronic document 918. The comment 922 may be encapsulated into a comment object or other data structure and transmitted to a machine 908, to be stored in a comment list 912 via a data access module 906. After the comment 922 is stored in the comment list 912, a notification may be transmitted from the machine 910 to an author client device 914, where a user operating the client device 914 has the document open contemporaneously with the user at the reviewer client device 916.

When a user (author) at the author client device 914 saves the document 918, the saved document 924 is transmitted back to the machine 908, which updates the comment list 912 and also transmits a copy of the saved document to the reviewer client device 916.

Articles for Managing Comments

Figure 10:
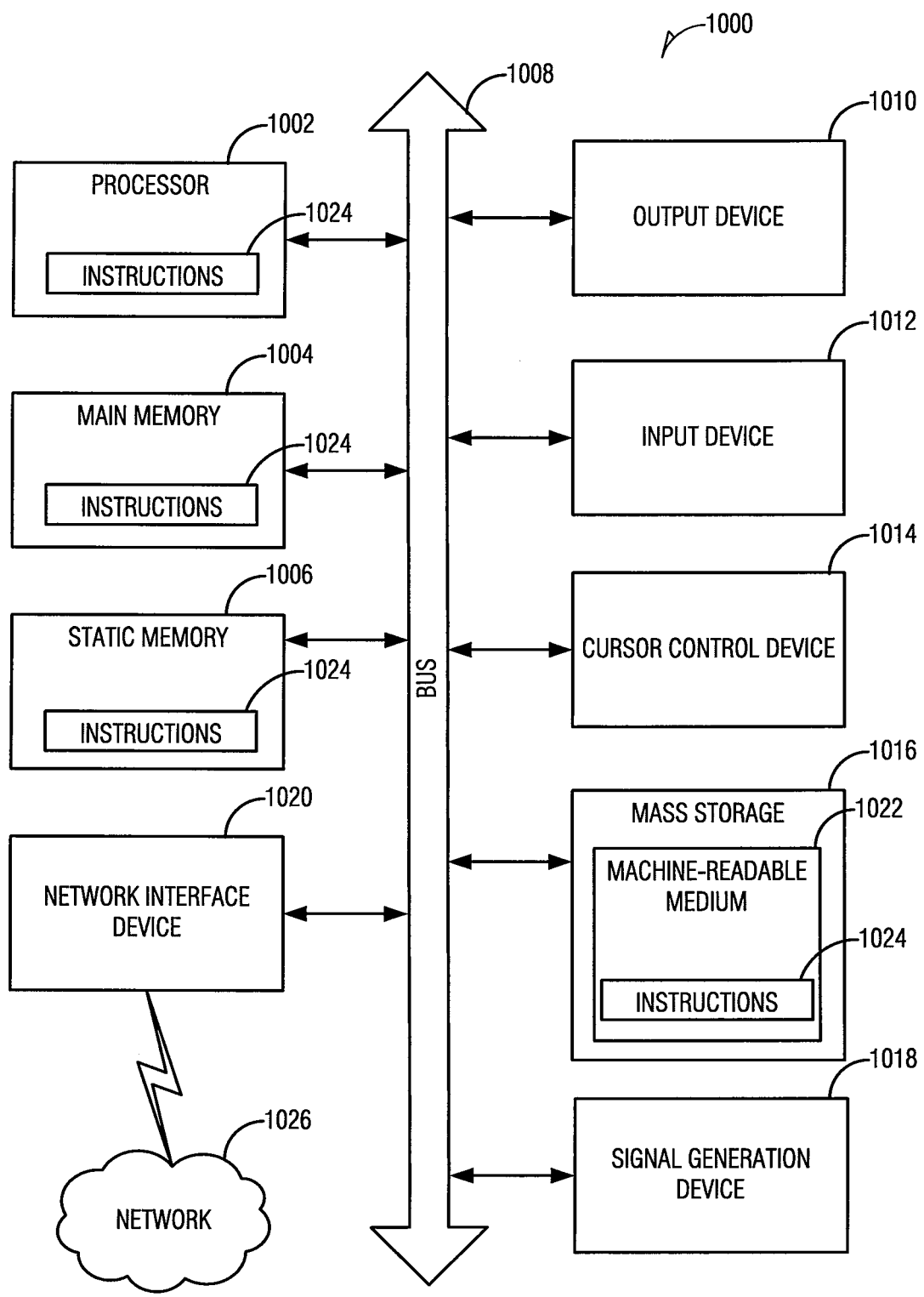
FIG. 10 is a block diagram of an article of manufacture, according to various embodiments.

FIG. 10 is a block diagram of an article of manufacture 1000, according to various embodiments. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment.

Thus, other embodiments may be realized. For example, an article of manufacture, such as a computer, a memory system, a magnetic or optical disk, some other storage device, and/or any type of electronic device or system may include one or more processors 1002 coupled to a machine-readable medium 1022 such as a memory (e.g., removable storage media, as well as any memory including an electrical, optical, or electromagnetic conductor) having instructions 1024 stored thereon (e.g., computer program instructions), which when executed by the one or more processors 1002 result in performing any of the actions described with respect to the methods above.

Machine 1000 may take the form of a computer system having a processor 1002 coupled to a number of components directly, and/or using a bus 1008. Such components may include main memory 1004, static or non-volatile memory 1006, and mass storage 1016. Other components coupled to the processor 1002 may include an output device 1010, such as a video display, an input device 1012, such as a keyboard, and a cursor control device 1014, such as a mouse. A network interface device 1020 to couple the processor 1002 and other components to a network 1026 may also be coupled to the bus 1008. The instructions 1024 may further be transmitted or received over the network 1026 via the network interface device 1020 utilizing any one of a number of well-known transfer protocols (e.g., HTTP). Any of these elements coupled to the bus 1008 may be absent, present singly, or present in plural numbers, depending on the specific embodiment to be realized.

The processor 1002, the memories 1004, 1006, and the storage device 1016 may each include instructions 1024 which, when executed, cause the machine 1000 to perform any one or more of the methods described herein. In alternative embodiments, the machine 1000 operates as a standalone device or may be connected (e.g., networked) to other machines. In a networked environment, the machine 1000 may operate in the capacity of a server or a client machine in server-client network environment, or as a peer machine in a peer-to-peer (or distributed) network environment. The machine 1000 may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine 1000 is illustrated, the term "machine" shall also be taken to include any collection of machines that individually or jointly execute a set (or multiple sets) of instructions to perform any one or more of the methodologies discussed herein. The machine 1000 may be similar to or identical to the machine 908 of FIG. 9.

While the machine-readable medium 1022 is shown as a single medium, the term "machine-readable medium" should be taken to include a single medium or multiple media (e.g., a centralized or distributed database, and/or associated caches and servers, and or a variety of storage media, such as the processor 1002 registers, memories 1004, 1006, and the storage device 1016) that store the one or more sets of instructions 1024. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include tangible media, such as solid-state memories and optical and magnetic media.

Conclusion

Implementing the apparatus, systems, and methods of the various embodiments may provide the ability to more efficiently add, remove, or revise comments in documents. In addition, apparatus, systems, and methods of the various embodiments may be used to synchronize the comments among several versions of an open document.

Although embodiments of the invention have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those of ordinary skill in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A computer-implemented method comprising:
receiving a comment object from a first client computer, the comment object being associated with an electronic document accessed from at least the first client computer and having a data structure that includes a reference specification field containing a numeric identification that describes at least one of a beginning or an ending of a commented portion in a numerical format and containing context information that identifies at least one of the beginning or the ending of the commented portion using text from the beginning or the ending of the commented portion;
assigning a unique identifier to the comment object;
placing the comment object in a queue according to the unique identifier;
forwarding the comment object to a second client computer for automatic propagation thereof in response to the second client computer concurrently accessing the electronic document with the first client computer;
receiving an indication that the forwarded comment object has been merged into the electronic document on the second client computer and that the electronic document has been saved to provide a saved electronic document incorporating the forwarded comment object; and
removing, using a processor of a machine, the forwarded comment object from the queue based on the electronic document being saved.

2. The computer-implemented method of claim 1, further comprising, before forwarding the comment object:
notifying the second client computer of the existence of the comment object; and
receiving a request to forward the comment object to the second client computer.

3. The computer-implemented method of claim 1, wherein the removing of the forwarded comment object from the queue further comprises removing any comment objects that have unique identifiers with values less than or equal to the unique identifier of the forwarded comment object.

4. The computer-implemented method of claim 3, further comprising: transmitting the saved electronic document to the first client computer.

5. The method of claim 1, wherein the numerical identification is used to identify a location of the commented portion and the context information is used to verify the location of the commented portion identified by the numerical identification.

6. A computer-implemented method comprising:
presenting an electronic document at a first client computer;
receiving a notification from a server computer, the notification indicating that a new comment object associated with the electronic document exists;
requesting the new comment object from the server computer for automatic propagation thereto, the new comment object being associated with the electronic document concurrently accessed from a second client computer and having a data structure that includes a reference specification field containing a numeric identification that describes at least one of a beginning or an ending of a commented portion in a numerical format and containing context information that identifies at least one of the beginning or the ending of the commented portion using text from the beginning or the ending of the commented portion;

presenting a revised electronic document having the new comment object merged therein on the first client computer; and saving, using a processor of the first client computer, the electronic document to provide a saved electronic document, the saving causing removal of the new comment object from a queue of the server computer.

7. The computer-implemented method of claim 6 wherein the saving of the electronic document at the server computer further comprises removing any comment objects that have unique identifiers with values less than or equal to a unique identifier of the new comment object.

8. The computer-implemented method of claim 7, wherein the merging of the new comment object is performed in-memory at the first client computer.

9. The computer-implemented method of claim 7, wherein saving the electronic document occurs responsive to at one of: a manual save operation, a timed save operation, or a triggered save operation.

10. The computer-implemented method of claim 6, wherein presenting the revised electronic document comprises:

determining an action associated with the new comment object; and presenting comment content associated with the new comment object when the action is an add operation or a modify operation.

11. The computer-implemented method of claim 6, wherein presenting the revised electronic document comprises:

determining an action associated with the new comment object; and removing a comment from the electronic document when the action is a delete operation, the comment corresponding to the new comment object.

12. The computer-implemented method of claim 6, wherein the new comment object includes a data structure, the data structure including an action field, a unique identifier field, a reference specification field, and a comment content field.

13. A computer-implemented method comprising:

receiving a plurality of comment objects from a plurality of client computers, each client computer accessing an electronic document, and each of the plurality of comment objects being associated with the electronic document accessed from the plurality of client computers and having a data structure that includes a reference specification field containing a numeric identification that describes at least one of a beginning or an ending of a commented portion in a numerical format and containing context information that identifies at least one of the beginning or the ending of the commented portion using text from the beginning or the ending of the commented portion;

assigning unique identifiers to each one of the plurality of comment objects;

placing the comment objects in a queue according to the unique identifiers;

forwarding at least one of the plurality of comment objects to an authoring client computer for automatic propagation thereof when the authoring client computer is concurrently accessing the electronic document with at least one of the client computers;

receiving an indication that the at least one of the plurality of forwarded comment objects has been merged into the electronic document on the authoring client computer and that the electronic document has been saved thereto;

determining a highest unique identifier associated with the at least one of the plurality of forward comment objects; and removing, using a processor of a machine, comment objects from the queue that have unique identifiers with values less than or equal to the determined highest unique identifier based on the receiving of the indication.

14. The computer-implemented method of claim 13, wherein the assigning of the unique identifiers to each one of the plurality of comment objects comprises:

assigning incrementing identifiers to each one of the plurality of comment objects.

15. A non-transitory machine-readable medium including instructions, which when executed by a machine, cause the machine to perform operations comprising:

receiving a comment object from a first client computer, the comment object associated with an electronic document accessed from the first client computer and having a data structure that includes a reference specification field containing a numeric identification that describes at least one of a beginning or an ending of a commented portion in a numerical format and containing context information that identifies at least one of the beginning or the ending of the commented portion using text from the beginning or the ending of the commented portion;

assigning the comment object a unique identifier;

placing the comment object in a queue according to the unique identifier; notifying a second client computer of the existence of the comment object; receiving a request to forward the comment object to the second client computer;

forwarding the comment object as a forwarded comment object to a second client computer for automatic propagation thereof in response to the second client computer concurrently accessing the electronic document with the first client computer;

receiving an indication that the forwarded comment object has been merged into the electronic document accessed by the second client computer and that the electronic document has been saved to provide a saved electronic document; and removing the forwarded comment object from the queue based on the receiving of the indication.

16. The non-transitory machine-readable medium of claim 15, further comprising instructions, which when executed by the machine, cause the machine to perform operations comprising:

removing any comment objects that have unique identifiers with values less than or equal to the unique identifier of the forwarded comment object from the queue.

17. The non-transitory machine-readable medium of claim 15, further comprising instructions, which when executed by the machine, cause the machine to perform operations comprising: transmitting the saved electronic document to the first client computer.

18. A computing system comprising:

a processor coupled to a non-transitory computer-storage medium, the computer-storage medium having stored thereon a plurality of computer software modules executable by the processor, the computer software modules comprising:

an electronic document transaction module configured to receive a comment object from a first client computer, the comment object associated with an electronic document to be accessed from the first client computer and having a data structure that includes a reference specification field containing a numeric identification that describes at least one of a beginning or an ending of a commented portion in a numerical format and containing context information that identifies at least one of the beginning or the ending of the commented portion using text from the beginning or the ending of the commented portion; and a data access module coupled to the electronic document transaction module and configured to assign a unique identifier to the comment object and to place the comment object in a queue according to the unique identifier, the data access module being further configured to forward the comment object as a forwarded comment object to a second client computer for automatic propagation in response to the second client computer opening the electronic document concurrently with the first client computer, the electronic document transaction module is further configured to receive an indication that the forwarded comment object has been merged into the electronic document on the second client computer and that the electronic document has been saved and remove the forwarded comment object from the queue based on the receiving of the indication of the save.

19. The system of claim 18, wherein the electronic document transaction module is further configured to:

notify the second client computer of the existence of the comment object; and receive a request to forward the comment object to the second client computer.

20. The system of claim 18, wherein the electronic document transaction module is further configured to:

remove any comment objects that have unique identifiers with values less than or equal to the unique identifier of the forwarded comment object from the queue.

21. The system of claim 20, wherein the electronic document transaction module is further configured to:

transmit the saved electronic document to the first client computer.

\* \* \* \* \*